US009596450B2

(12) United States Patent
Ogawa et al.

(10) Patent No.: US 9,596,450 B2
(45) Date of Patent: Mar. 14, 2017

(54) VIDEO TRANSMISSION DEVICE, VIDEO TRANSMISSION METHOD, AND VIDEO PLAYBACK DEVICE

(71) Applicant: Panasonic Corporation, Osaka (JP)

(72) Inventors: Tomoki Ogawa, Osaka (JP); Hiroshi Yahata, Osaka (JP); Toru Kawaguchi, Tokyo (JP)

(73) Assignee: PANASONIC CORPORATION, Osaka (JP)

( * ) Notice: Subject to any disclaimer, the term of this patent is extended or adjusted under 35 U.S.C. 154(b) by 366 days.

(21) Appl. No.: 14/234,742

(22) PCT Filed: May 23, 2013

(86) PCT No.: PCT/JP2013/003283
§ 371 (c)(1),
(2) Date: Jan. 24, 2014

(87) PCT Pub. No.: WO2013/175796
PCT Pub. Date: Nov. 28, 2013

(65) Prior Publication Data
US 2014/0152766 A1   Jun. 5, 2014

Related U.S. Application Data

(60) Provisional application No. 61/651,222, filed on May 24, 2012, provisional application No. 61/654,307, (Continued)

(51) Int. Cl.
*H04N 13/00* (2006.01)
*H04N 21/65* (2011.01)
(Continued)

(52) U.S. Cl.
CPC ..... *H04N 13/0059* (2013.01); *H04N 13/0066* (2013.01); *H04N 21/4622* (2013.01); *H04N 21/816* (2013.01); *H04N 21/6587* (2013.01)

(58) Field of Classification Search
None
See application file for complete search history.

(56) References Cited

U.S. PATENT DOCUMENTS

2010/0150523 A1* 6/2010 Okubo ................... H04N 5/782
386/343
2011/0141364 A1* 6/2011 Lee ...................... H04N 5/4401
348/569

(Continued)

FOREIGN PATENT DOCUMENTS

JP       11-69346      3/1999
JP     2011-41242      2/2011

(Continued)

OTHER PUBLICATIONS

International Search Report issued Jun. 25, 2013 in International (PCT) Application No. PCT/JP2013/003283.
(Continued)

*Primary Examiner* — Reza Aghevli
(74) *Attorney, Agent, or Firm* — Wenderoth, Lind & Ponack, L.L.P.

(57) ABSTRACT

A video transmission device for transmitting a video image so that a video playback device can recognize a transmission path for an additional-view video image transmittable through various transmission paths, and play back a 3D video image. The video transmission device includes: a storage unit for storing therein video images transmitted through respective virtual channels, and virtual channel information pieces including definition information pieces defining the respective virtual channels; and a transmission unit for transmitting the video images and the virtual chan-
(Continued)

nel information pieces through the respective virtual channels, wherein the stored video images include one of two viewpoint images constituting the 3D video image, and, in one of the definition information pieces defining one of the virtual channels through which the one of the two viewpoint images is transmitted, transmission form information indicating a form of transmitting the other one of the two viewpoint images is described.

4 Claims, 29 Drawing Sheets

Related U.S. Application Data filed on Jun. 1, 2012, provisional application No. 61/656,303, filed on Jun. 6, 2012, provisional application No. 61/660,104, filed on Jun. 15, 2012.

(51) Int. Cl.
*H04N 21/81* (2011.01)
*H04N 21/462* (2011.01)
*H04N 21/6587* (2011.01)

(56) References Cited

U.S. PATENT DOCUMENTS

| | | | | |
|---|---|---|---|---|
| 2011/0149020 | A1* | 6/2011 | Klebanov | H04N 5/85 348/42 |
| 2011/0273541 | A1* | 11/2011 | Kitazato | H04N 13/0059 348/51 |
| 2011/0289542 | A1* | 11/2011 | Kitazato | H04N 21/2625 725/115 |
| 2011/0293240 | A1* | 12/2011 | Newton | H04N 13/0022 386/230 |
| 2012/0050154 | A1* | 3/2012 | Jagmag | G06F 3/011 345/156 |
| 2012/0150523 | A1* | 6/2012 | Choi | G06F 17/5018 703/14 |
| 2012/0293618 | A1* | 11/2012 | Tsukagoshi | H04N 13/0059 348/43 |
| 2013/0141536 | A1* | 6/2013 | Choe | H04N 5/44591 348/43 |

FOREIGN PATENT DOCUMENTS

| | | |
|---|---|---|
| JP | 2011-82666 | 4/2011 |
| JP | 2011-250218 | 12/2011 |
| JP | 2012-244411 | 12/2012 |

OTHER PUBLICATIONS

ITU-T H.264, Series H: Audiovisual and Multimedia Systems, Infrastructure of audiovisual services—Coding of moving video, Advanced video coding for generic audiovisual services, Mar. 2010.
ISO/IEC 14496-10, Information technology—Coding of audio-visual objects -, Part 10: Advanced Video Coding, Second edition, Oct. 1, 2004.
ATSC Digital Television Standard: Part 1—Digital Television System, Document A/53 Part 1:2009, Aug. 7, 2009.
ATSC Digital Television Standard—Part 2: RF/Transmission System Characteristics, Doc. A/53 Part 2:2011, Dec. 15, 2011.
ATSC Digital Television Standard: Part 3—Service Multiplex and Transport Subsystem Characteristics, Document A/53 Part 3:2009, Aug. 7, 2009.
ATSC Digital Television Standard: Part 4—MPEG-2 Video System Characteristics, Document A/53 Part 4:2009, Aug. 7, 2009.
ATSC Digital Television Standard: Part 5—AC-3 Audio System Characteristics, Document A/53 Part 5:2010, Jul. 6, 2010.
ATSC Digital Television Standard: Part 6—Enhanced AC-3 Audio System Characteristics, Document A/53 Part 6:2010, Jul. 6, 2010.
ATSC Standard: Program and System Information Protocol for Terrestrial Broadcast and Cable (PSIP), Document A/65:2009, Apr. 14, 2009.
ATSC Standard: A/71:2012, Parameterized Services Standard, Doc. A/71:2012, Dec. 3, 2012.
ISO/IEC13818-1, Information technology—Generic coding of moving pictures and associated audio information: Systems, Second edition, Dec. 1, 2000.
ITU-T H.265, Series H: Audiovisual and Multimedia Systems, Infrastructure of audiovisual services—Coding of moving video, High efficiency video coding, Apr. 2013.

* cited by examiner

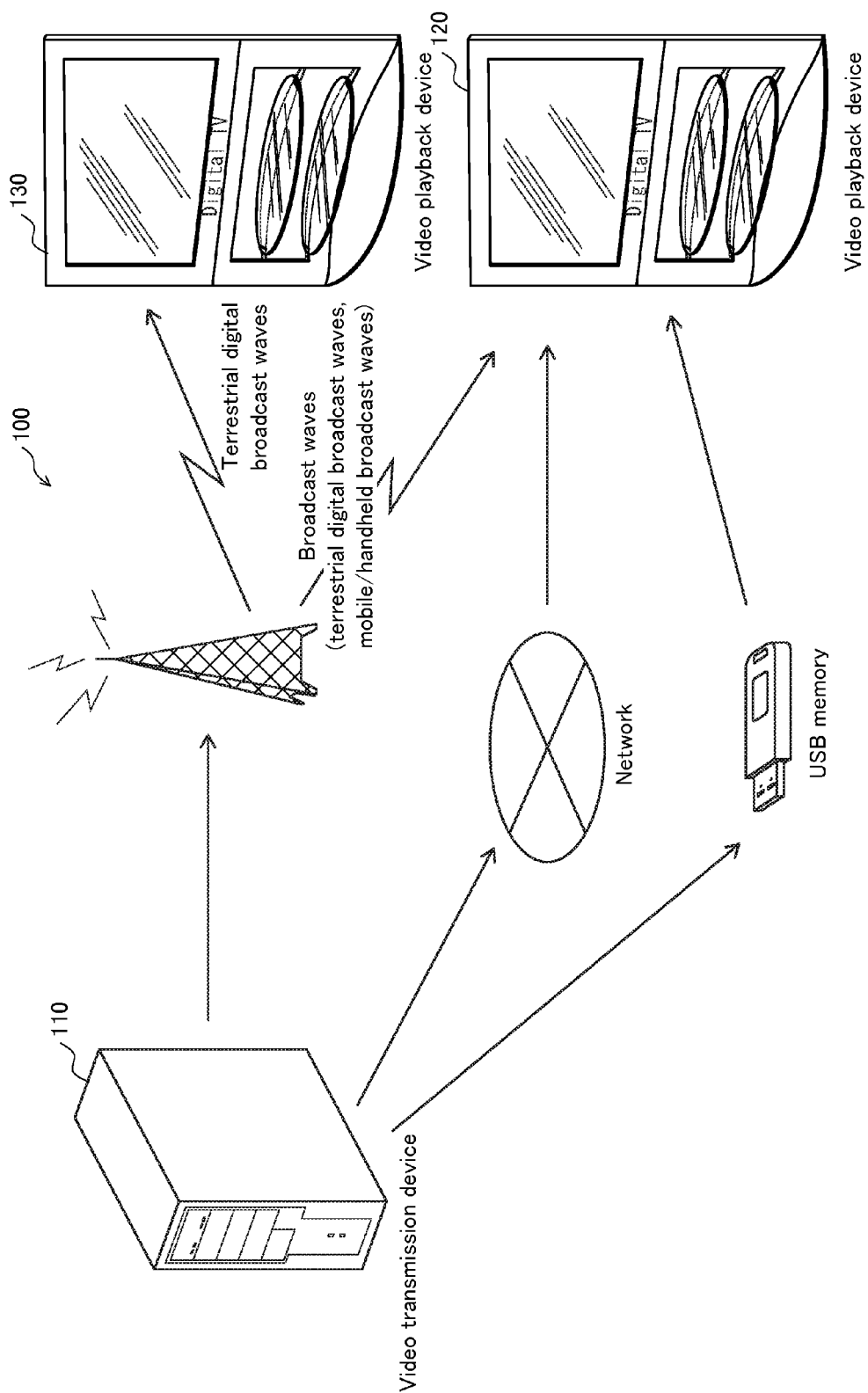

FIG.2

| Configuration form of 3D video image | |
|---|---|
| Name | Detail |
| Frame compatible | Form of encoding 3D video image in similar format to legacy 2D video image |
| Service compatible: common use | Form of using legacy 2D video image as base-view video image and separately transmitting additional-view video image |
| Service compatible: independent 3D | Form of transmitting independent 3D video image separately from legacy 2D video image |
| Service incompatible | Form of transmitting only 3D video image incompatible with legacy 2D video image without transmitting legacy 2D video image |

FIG.4

```
MGT(){
    table_id
        :
    tables_defined
    for(i=0;i<tables_defined;i++){
        table_type
        table_type_PID
        table_type_descriptors_length
        for(){
            descriptor1()
        }
    }
        :
    descriptor_length
    for(){
        descriptor2()
    }
        :
}
```

FIG.6

```
3D_program_info_descriptor(){
    descriptor_tag
    descriptor_length
    reserved
    3D_service_type
}
```
                                                                610

| 3D_service_type | | | |
|---|---|---|---|
| Value | Name | Video image transmitted through main transmission path | Video image transmitted through other transmission path and type of other transmission path |
| 0x0 | Frame compatible | MPEG2 (only 3D video image in side-by-side format, top-and-bottom format and the like) | No video image |
| 0x1 | Service compatible: common use type 1 | Legacy 2D video image (base-view video image) and additional-view video image | No video image |
| 0x2 | Service compatible: common use type 2 | Base-view video image (legacy 2D video image) | Additional-view video image Type of other transmission path: Internet |
| 0x3 | Service compatible: common use type 3 | Base-view video image (legacy 2D video image) | Additional-view video image Type of other transmission path: mobile/handheld broadcasting |
| 0x4 | Service compatible: common use type 4 | Base-view video image (legacy 2D video image) | Additional-view video image Type of other transmission path: storage medium |
| 0x5 | Service compatible: common use type 5 | Base-view video image (legacy 2D video image) | Additional-view video image Type of other transmission path: another stream |
| 0x6 | Service compatible: independent 3D type 1 | Independent 3D video image (base-view video image and additional-view video image) | No video image |
| 0x7 | Service compatible: independent 3D type 2 | Base-view video image | Additional-view video image Type of other transmission path: Internet |
| 0x8 | Service compatible: independent 3D type 3 | Base-view video image | Additional-view video image Type of other transmission path: mobile/handheld broadcasting |
| 0x9 | Service compatible: independent 3D type 4 | Base-view video image | Additional-view video image Type of other transmission path: storage medium |
| 0xA | Service compatible: independent 3D type 5 | Base-view video image | Additional-view video image Type of other transmission path: another stream |
| 0xB | Frame incompatible | Base-view video image (incompatible with legacy 2D video image) and additional-view video image (incompatible with legacy 2D video image) | No video image |

FIG.7

```
3D_service_location_descriptor(){
    descriptor_tag
    descriptor_length
    reserved
    PCR_PID
    number_elements
    for(i=0;i< number_elements;i++){
        stream_type
        elementary_PID
        ISO_639_language_code
        if(stream_type==video stream){
            horizontal_resolution
            vertical_resolution
            frame_rate
        }
    }
    number_elements_from_other_path
    if(number_elements_from_other_path!=0){
        ES_location
        ES_Location_info()
        for(j=0;j< N;j++){
            stream_type
            elementary_PID
            ISO_639_language_code
            if(stream_type==video stream){
                horizontal_resolution
                vertical_resolution
                frame_rate
            }
        }
    }
}
```

- 710 (inner block containing 711)
- 711 (horizontal_resolution, vertical_resolution, frame_rate)
- 720 (second block containing 721)
- 721 (horizontal_resolution, vertical_resolution, frame_rate)

750

| ES_location | |
|---|---|
| Value | Detail |
| 000 | Through Internet |
| 001 | Through mobile/handheld broadcasting |
| 010 | Through storage medium |
| 011 | Through another stream |
| Others | Reserved |

760

| ES_location_info |
|---|
| Details of ES_location (e.g. URL, broadcast channel, identifier of storage medium) are described. |

FIG.8

```
EIT(){
    table_id
      :
    source_id
    num_events_in_section
    for(j=0;j<num_events_in_section;j++){
          :
        event_id
        start_time
          :
        ETM_location
          :
        title_length
        title_text()
          :
        descriptors_length
        for(i=0;i<N;i++){
            descriptor()   ···ex.2D_3D_channel_linkage_descriptor,
                              2D_3D_relationship_descriptor()
        }
    }
      :
}
```

FIG.9

```
2D_3D_channel_linkage_descriptor(){
    descriptor_tag
    descriptor_length
        :
    linkage_direction
    if(linlage_direction==01 or 10){
        channel_TSID_ref
        source_id_ref
        event_id_ref
        is_different_physical_channel
    }
}
```

| linkage_direction | |
|---|---|
| Value | Detail |
| 00 | There is no linked EIT (there is no linked virtual channel). |
| 01 | There is linked EIT for 3D (there is 3D virtual channel linked to own (2D) virtual channel). |
| 10 | There is linked EIT for 2D (there is 2D virtual channel linked to own (3D) virtual channel). |
| 11 | Reserved |

| channel_TSID_ref |
|---|
| TSID of transport stream for transmitting linked EIT (virtual channel) |

| source_id_ref |
|---|
| Source_id for identifying virtual channel for transmitting linked EIT |

| event_id_ref |
|---|
| Event_id for identifying linked EIT (program) |

| is_different_physical_channel | |
|---|---|
| Value | Detail |
| 00 | Transmitted through different physical channel |
| 01 | Transmitted through the same physical channel |

FIG.10

```
2D_3D_relationship_descriptor(){
    descriptor_tag
    descriptor_length
    reserved
    if(3D_service_type is service compatible: common use){
        2D_presentation_allowed
        leftview_flag
        reserved
    }
    else if(3D_service_type is service compatible: independent 3D){
        2D_presentation_allowed
        content_identical_status
        same_contents_length_flag
        reserved
    }
}
```

1010

| 2D_presentation_allowed | |
|---|---|
| Value | Detail |
| 00 | Neither 2D display using base-view video images nor 2D display using additional-view video images is allowed. |
| 01 | 2D display using additional-view video images is allowed. |
| 10 | 2D display using base-view video images is allowed. |
| 11 | 2D display using base-view video images and 2D display using additional-view video images are both allowed. |

| leftview_flag | |
|---|---|
| Value | Detail |
| 00 | Base-view video image is right-view image. |
| 01 | Base-view video image is left-view image. |
| 10 | Base-view video image is neither left-view image nor right-view image. |

1020

1030

| content_identical_status | |
|---|---|
| Value | Detail |
| 000 | Neither base-view video image nor additional-view video image is identical to legacy 2D video image, i.e. 2D version of video image is transmitted with respect to base-view video image and additional-view video image constituting 3D video image. |
| 001 | Additional-view video image is identical to legacy 2D video image. |
| 010 | Base-view video image is identical to legacy 2D video image. |
| 011 | Base-view video image and additional-view video image are each identical to legacy 2D video image. |
| 100 | Neither base-view video image nor additional-view video image is identical to legacy 2D video image, but base-view video image and additional-view video image are identical to each other. |
| Others | reserved |

1040

| same_contents_length_flag | |
|---|---|
| Value | Detail |
| 0 | 2D program relating to legacy 2D video images and 3D program relating to independent 3D video images are different in length. |
| 1 | 2D program relating to legacy 2D video images and 3D program relating to independent 3D video images are the same in length. |

FIG.12A

| Encoding unit selection table | | | |
|---|---|---|---|
| 3D_service _type | Video encoding unit 1111 (MPEG2) | Video encoding unit 1112 (MPEG4 AVC) | Video encoding unit 1113 (MPEG4 MVC) |
| 0x0 | 3D video image 1160 (frame compatible) | Not operated | Not operated |
| 0x1 to 0x5 | Left-view image 1161 (legacy 2D video image) | Right-view image 1162 | Not operated |
| 0x6 to 0xA | Left-view image 1161 (legacy 2D video image) | Not operated | Independent 3D video image 1163 |
| 0xB | 3D video image 1164 (service incompatible) | Not operated | Not operated |

FIG.12B

| Upstream processing unit selection table | | | |
|---|---|---|---|
| 3D_service _type | Upstream processing unit located upstream of multiplexing processing unit 1121 | | Re-multiplexing is required? |
| 0x0 | Video encoding unit 1111 (3D video image 1160) | Not operated | Not required |
| 0x1 | Video encoding unit 1111 (left-view image 1161) | Video encoding unit 1112 (right-view image 1162) | Required |
| 0x2 to 0x5 | Video encoding unit 1111 (left-view image 1161) | Video encoding unit 1112 (right-view image 1162) | Not required |
| 0x6 | Video encoding unit 1111 (left-view image 1161) | Video encoding unit 1113 (independent 3D video image 1163) | Required |
| 0x7 to 0xA | Video encoding unit 1111 (left-view image 1161) | Video encoding unit 1113 (independent 3D video image 1163) | Not required |
| 0xB | Video encoding unit 1111 (3D video image 1164) | Not operated | Required |

FIG.20

```
ES_location_info(){
    if(ES_location==011(Through other broadcast stream)){
        transport_stream_id_ref
        source_id_ref
        WithinSamePhysicalChannel
        ...
    }
    else if(ES_location==000(Through Internet)){
        URL
        ...
    }
    else if(ES_location==010(Through storage medium)){
        MediaID
        ...
    }
    else{
        ...
    }
}
```

S2001

| WithinSamePhysicalChannel | |
|---|---|
| Value | Detail |
| 00 | Transmitted through different physical channel |
| 01 | Transmitted through the same physical channel |

FIG.22

| 2D_3D_linkage_info | |
|---|---|
| Value | Detail |
| 00 | 2D virtual channel and 3D virtual channel are not linked to each other, and EIT for 2D and EIT for 3D are not linked to each other. |
| 01 | 2D virtual channel and 3D virtual channel are linked to each other (e.g. registration order within VCT). |
| 10 | EIT for 2D and EIT for 3D are linked to each other. |
| 11 | Reserved |

VIDEO TRANSMISSION DEVICE, VIDEO TRANSMISSION METHOD, AND VIDEO PLAYBACK DEVICE

This application claims benefit to the U.S. Provisional Application No. 61/651,222, filed on May 24, 2012, U.S. Provisional Application No. 61/654,307, filed on Jun. 1, 2012, U.S. Provisional Application No. 61/656,303, filed on Jun. 6, 2012 and U.S. Provisional Application No. 61/660,104, filed on Jun. 15, 2012.

TECHNICAL FIELD

The present invention relates to a system for transmitting and receiving a 3D video image in accordance with the Advanced Television Systems Committee (ATSC) standard.

BACKGROUND ART

In recent years, 2D video broadcasting using digital broadcast waves conforming to the ATSC standard has been conducted in North America (see Non-Patent Literatures 1-8). Meanwhile, opportunities for viewing 3D video images have increased as 3D movies have been shown in movie theaters and use of Blu-ray Discs (registered trademark) and the like has enabled users to play back 3D video images at homes. Under such circumstances, there has been an increased demand for viewing 3D video images by broadcast.

CITATION LIST

Non-Patent Literature

[Non-Patent Literature 1]
ATSC Standard A/53, Part 1: 2009, Digital Television System, Aug. 7, 2009
[Non-Patent Literature 2]
ATSC Standard A/53, Part 2: 2011, RF/Transmission System Characteristics, Dec. 15, 2011
[Non-Patent Literature 3]
ATSC Standard A/53, Part 3: 2009, Service Multiplex and Transport Subsystem Characteristics, Aug. 7, 2009
[Non-Patent Literature 4]
ATSC Standard A/53, Part 4: 2009, MPEG-2 Video System Characteristics, Aug. 7, 2009
[Non-Patent Literature 5]
ATSC Standard A/53, Part 5: 2010, AC-3 Audio System Characteristics, Jul. 6, 2010
[Non-Patent Literature 6]
ATSC Standard A/53, Part 6: 2010, Enhanced AC-3 Audio System Characteristics, Jul. 6, 2010
[Non-Patent Literature 7]
ATSC Standard A/65, 2009: Program and System Information Protocol for Terrestrial Broadcast and Cable, Apr. 14, 2009
[Non-Patent Literature 8]
ATSC Standard A/71: 2012, ATSC Parameterized Services Standard, Dec. 3, 2012

SUMMARY OF INVENTION

Technical Problem

A 3D video image is different from a 2D video image in that the 3D video image is composed of a base-view video image and an additional-view video image, while the 2D video image comprises a single video image. The existing ATSC standard assumes transmitting and receiving 2D video images and does not take transmitting and receiving 3D video images into consideration. Thus, a video playback device can receive a single video image (a base-view video image) through a single transmission path, but cannot further identify a transmission path for an additional-view video image to receive the additional-view video image, and play back a 3D video image from both of the images.

The present invention has been conceived in view of the above-mentioned problem, and aims to provide a video transmission device and a video transmission method for transmitting video images so that the video playback device can identify the transmission path for the additional-view video image, which can be transmitted through a different transmission path from a transmission path for the base-view video image, and receive and play back 3D video images. The present invention also aims to provide the video playback device for playing back the 3D video images.

Solution to Problem

In order to solve the above-mentioned problem, a video transmission device pertaining to the present invention is a video transmission device for transmitting a video image, comprising: a storage unit configured to store therein a plurality of video images transmitted through respective virtual channels, and virtual channel information pieces including definition information pieces defining the respective virtual channels; and a transmission unit configured to transmit the video images and the virtual channel information pieces through the respective virtual channels, wherein the video images stored in the storage unit include one of two viewpoint images constituting a 3D video image, and in one of the definition information pieces defining one of the virtual channels through which the one of the two viewpoint images is transmitted, transmission form information indicating a form of transmitting the other one of the two viewpoint images constituting the 3D video image is described.

Advantageous Effects of Invention

With this structure, the video playback device for receiving the video image can identify, with reference to one of the definition information pieces when selecting a virtual channel through which the 3D video image is received, a transmission path for the one of the two viewpoint images and a transmission path for the other one of the two viewpoint images. Thus, even when the one of the two viewpoint images and the other one of the two viewpoint images are transmitted through different transmission paths, the video playback device can acquire both of the images and play back the 3D video image.

BRIEF DESCRIPTION OF DRAWINGS

FIG. 1 illustrates the configuration of a video transmission/reception system pertaining to one embodiment of the present invention.
FIG. 2 shows a list of configuration forms of 3D video images.
FIG. 4 shows a data structure of the MGT.
FIG. 6 shows a 3D_program_info_descriptor.

FIG. 7 shows a 3D_service_location_descriptor.

FIG. 8 shows a data structure of the EIT.

FIG. 9 shows a 2D_3D_channel_linkage_descriptor.

FIG. 10 shows a 2D_3D_relationship_descriptor.

FIG. 12A shows one example of an encoding unit selection table, and FIG. 12B shows one example of an upstream processing unit selection table.

FIG. 20 shows an ES_location_info pertaining to one modification of the present invention.

FIG. 22 shows a 2D_3D linkage info pertaining to another modification of the present invention.

DESCRIPTION OF EMBODIMENTS

Figure 3:
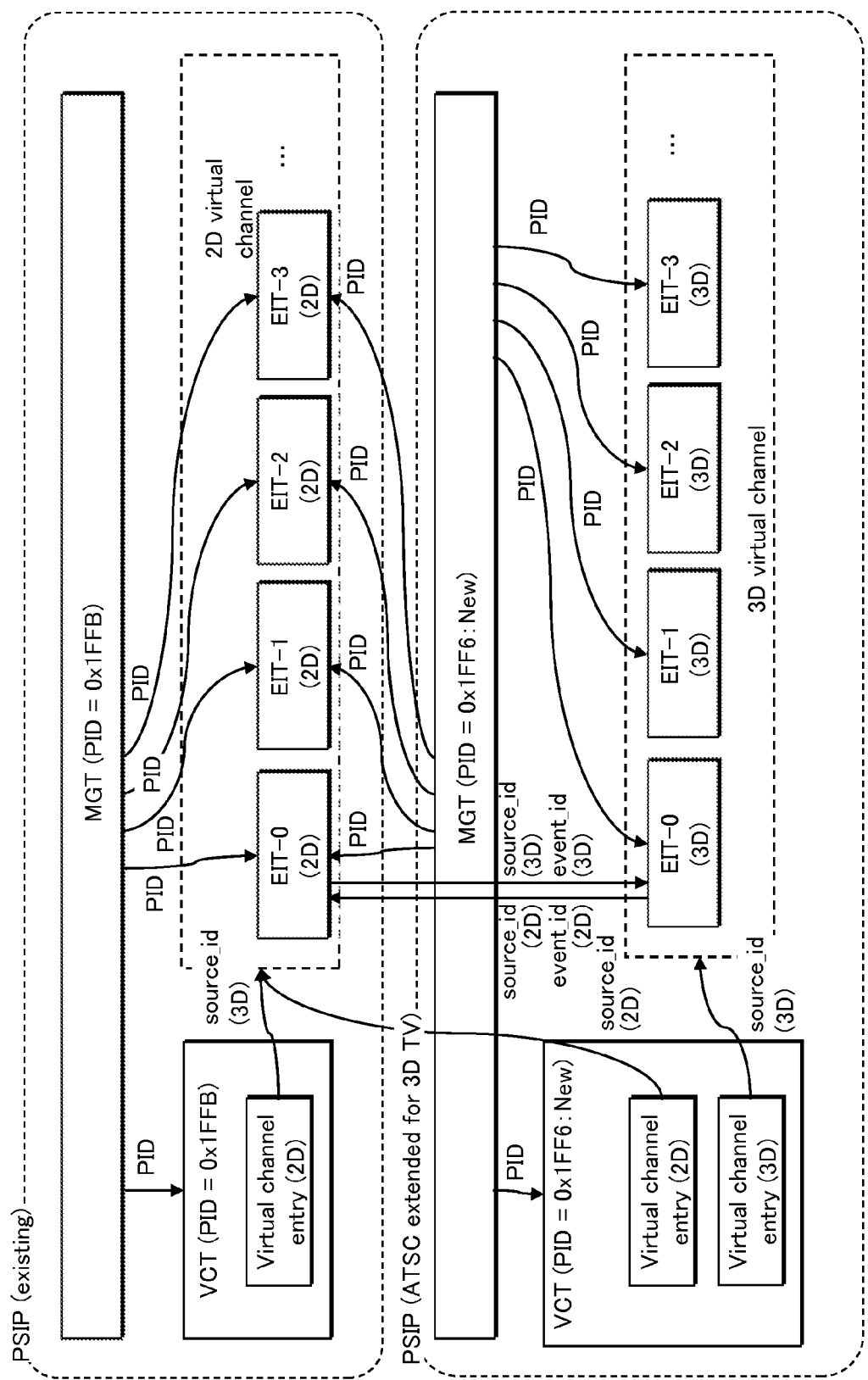
FIG. 3 schematically shows interrelationships among an MGT, a VCT, and an EIT.

The following describes one embodiment of the present invention with reference to the drawings.

FIG. 1 illustrates the configuration of a video transmission/reception system 100 pertaining to the embodiment of the present invention.

The video transmission/reception system 100 is a system for transmitting and receiving 2D video images and 3D video images in accordance with the extended ATSC standard, which is set by extending the existing ATSC standard. The existing ATSC standard is extended, because the existing ATSC standard assumes transmitting and receiving 2D video images and thus information necessary for transmitting and receiving 3D video images cannot be described in Program and System Information Protocol for Terrestrial Broadcast and Cable (PSIP) information conforming to the existing ATSC standard. The extended ATSC standard described herein is the PSIP standard (ATSC Standard A/65, 2009: PSIP, issued on Apr. 14, 2009), which is one of the ATSC standards defining the PSIP information, having been extended so that information necessary for transmitting and receiving 3D video images can be described. The PSIP standard having been extended is hereinafter referred to as the "extended PSIP standard". The extended ATSC standard has been set so as to have upward compatibility with the existing ATSC standard.

As illustrated in FIG. 1, the video transmission/reception system 100 includes: a video transmission device 110 for transmitting 2D video images and 3D video images; a video playback device 120 for receiving and playing back the 2D video images and the 3D video images; and a video playback device 130 for receiving and playing back the 2D video images.

The video transmission device 110 transmits 2D video images and 3D video images in accordance with the extended ATSC standard.

The video playback device 130 receives and plays back the 2D video images, from among the 2D video images and the 3D video images transmitted from the video transmission device 110, in accordance with the existing ATSC standard. The video playback device 130 does not conform to the extended ATSC standard, and thus does not play back the 3D video images. 2D video images that are encoded and transmitted by the video transmission device 110 so that a video playback device (e.g. the video playback device 130) operating in accordance with the existing ATSC standard can receive and play back the 2D video images are herein referred to as "legacy 2D video images". Description of the existing ATSC standard, and a method and a device (e.g. the video playback device 130) for transmitting and receiving video images in accordance with the existing ATSC standard is omitted as they are well known.

The video playback device 120 operates in accordance with the extended ATSC standard. The video playback device 120 receives and plays back 2D video images and 3D video images transmitted by the video transmission device 110 in accordance with the extended ATSC standard.

The following first describes 3D video images and the PSIP information for use in the video transmission/reception system 100, before describing the configuration of the video transmission/reception system 100.

<1. Provision Form of 3D Video Images>

The following describes a provision form of 3D video images in the present embodiment. The provision form is defined by a configuration form and a transmission form.

<1.1 Configuration Form>

FIG. 2 shows a list of configuration forms of 3D video images.

As shown in FIG. 2, the configuration forms of 3D video images include four forms "frame compatible", "service compatible: common use", "service compatible: independent 3D", and "service incompatible".

The "frame compatible" is a form of encoding each of frames constituting a 3D video image in a format compatible with each of frames constituting a legacy 2D video image, such as a well-known side-by-side format and a well-known top-and-bottom format.

The "service compatible" is a form of encoding and transmitting 3D video images in accordance with the existing ATSC standard, so that playback of legacy 2D video images is also possible. The "service compatible" is roughly classified into two forms "service compatible: common use" and "service compatible: independent 3D".

The "service compatible: common use" is a form of using legacy 2D video images as video images (base-view video images) captured from one viewpoint, and separately preparing, for transmission, other video images (additional-view video images) corresponding to the respective base-view video images and captured from another viewpoint. For example, the base-view video images and the additional-view video images are respectively left-view images and right-view images constituting 3D video images.

The "service compatible: independent 3D" is a form of preparing, for transmission, 3D video images (hereinafter, referred to as "independent 3D video images") separately from legacy 2D video images. In the "service compatible: independent 3D", the video transmission device 110 transmits both the legacy 2D video images and the independent 3D video images.

The "service incompatible" is a form of preparing, for transmission, only 3D video images incompatible with legacy 2D video images, without transmitting the legacy 2D video images. In the "service incompatible", the video playback device 130, which operates in accordance with the existing ATSC standard, cannot play back video images at all, because the video transmission device 110 does not transmit legacy 2D video images.

As described above, since there are a plurality of configuration forms of 3D video images, the video playback device 120 needs to identify one of the above-mentioned four configuration forms of the 3D video images when playing back the 3D video images. To this end, the extended PSIP standard defines a 3D_program_info_descriptor for describing information for identifying a configuration form of a 3D video image to be transmitted. The 3D_program_info_descriptor is described in a Virtual Channel Table (VCT) as a descriptor.

<1.2. Transmission Form>

In the configuration form "service compatible: common use", the video transmission device 110 transmits additional-view video images in addition to legacy 2D video images as base-view video images. In the configuration form "service compatible: independent 3D", the video transmission device 110 transmits independent 3D video images (composed of base-view video images and additional-view video images) in addition to legacy 2D video images. In the configuration form "service incompatible", the video transmission device 110 transmits only 3D video images without transmitting legacy 2D video images.

The video transmission device 110 transmits additional-view video images through a transmission path (hereinafter, referred to as a "main transmission path") for base-view video images or through a transmission path (hereinafter, referred to as an "other transmission path") different from the main transmission path. Examples of the other transmission path includes: the Internet; mobile/handheld broadcasting, such as a digital TV broadcasting for mobile devices conforming to the ATSC-Mobile/Handheld (M/H) standard (ATSC A/153); a transport stream different from the main transmission path; and a storage medium, such as Universal Serial Bus (USB) memory.

In order to receive additional-view video images, the video playback device 120 needs to identify transmission forms of the additional-view video images. Information for distinguishing between transmission forms of additional-view video images is thus included in the above-mentioned 3D_program_info_descriptor. As information for identifying the other transmission path (e.g. Uniform Resource Locator (URL) in a case where the other transmission path is the Internet), a 3D_service_location_descriptor is defined. The 3D_service_location_descriptor is described in the VCT as a descriptor.

<2. Linkage between Program Composed of 2D Video Images and Program Composed of 3D Video Images>

In the digital TV broadcasting conforming to the extended ATSC standard (the same applies to the existing ATSC standard), broadcast signals (hereinafter, referred to as "virtual channels") for one or more programs are transmitted by broadcast signals (hereinafter, referred to as "physical channels") in a predetermined frequency band. Each virtual channel is identified by a virtual channel number composed of a four-digit main channel number corresponding to a physical channel, and a sub-channel number. As described above, additional-view video images may be transmitted through the other transmission path, and the other transmission path may not be broadcast waves. In such a case, a combination of the main transmission path and the other transmission path is a channel for transmitting a program. A transmission path that is the combination of the main transmission path and the other transmission path is referred to as a virtual channel in a broad sense.

In the case of movies, a program composed of 2D video images (hereinafter, referred to as a "2D program") and a program composed of 3D video images obtained by three-dimensionally forming the 2D video images (hereinafter, referred to as a 3D program") are supposed to be transmitted through different virtual channels for the same time period, so as to allow a user to select either one of the programs. In such a case, it is desirable to present a user with an option of switching between 2D viewing achieved by playing back the 2D program and 3D viewing achieved by playing back the 3D program. To this end, the video playback device 120 needs to identify linkage (relationship) between switchable 2D and 3D programs.

The extended PSIP standard thus defines a 2D_3D_channel_linkage_descriptor and a 2D_3D_relationship_descriptor as descriptors for linking an Event Information Table (EIT) for describing information relating to a 2D program (hereinafter, referred to as an "EIT for 2D") and an EIT for describing information relating to a 3D program (hereinafter, referred to as an "EIT for 3D"). The 2D_3D_channel_linkage_descriptor and the 2D_3D_relationship_descriptor are described in each of the EIT for 2D and the EIT for 3D.

<3. Extended PSIP Information>

Details of the extended PSIP standard are described below, focusing on a part extending the existing PSIP standard. The extended PSIP standard is set by extending specifications for a Master Guide Table (MGT), the VCT, and the EIT.

(1) Interrelationships among MGT, VCT, and EIT

FIG. 3 schematically shows interrelationships among the MGT, the VCT, and the EIT.

As shown in FIG. 3, the extended PSIP standard newly defines an MGT relating to 3D video images (hereinafter, referred to as an "MGT for 3D") and a VCT relating to the 3D video images (hereinafter, referred to as a "VCT for 3D"). The MGT for 3D and the VCT for 3D are each assigned with a PID "0x1FF6", which is not assigned in the existing PSIP standard. This can avoid trouble such as a malfunction of a video playback device (hereinafter, also referred to as a "legacy playback device") that conforms only to the existing PSIP standard and does not conform to the extended PSIP standard caused by acquiring the MGT for 3D and the VCT for 3D. The MGT for 3D is assigned with a table ID "0xC7", which is the same as that assigned to the existing MGT. The VCT for 3D is assigned with a table ID "0xC8" (in the case of a terrestrial virtual channel table (TVCT)) or a table ID "0xC9" (in the case of a cable virtual channel table (CVCT)), which is the same as that assigned to the existing VCT. The VCT is described below without distinguishing between the TVCT and the CVCT unless it is particularly necessary.

As described above, since the MGT for 2D and the MGT for 3D are distinguished by the PID, the legacy playback device no longer acquires the MGT for 3D. Compatibility problems such as a malfunction of the legacy playback device caused by misinterpreting contents of the MGT for 3D can thus be prevented.

PIDs of the EITs for 2D (EIT-0 (2D), EIT-1 (2D), . . . in FIG. 3) and PIDs of the EITs for 3D (EIT-0 (3D), EIT-1 (3D), . . . in FIG. 3) are described in the MGT for 3D. The video playback device 120 identifies the PIDs of the EITs for 2D and the PIDs of the EITs for 3D by acquiring the MGT for 3D, and acquires the EITs for 2D and the EITs for 3D by the identified PIDs.

Definition information (hereinafter, referred to as a "virtual channel entry") defining a virtual channel used to transmit a 2D program and a 3D program is described in the VCT for 3D.

In each virtual channel entry, a source_id assigned to identify the virtual channel is described. In each EIT, a source_id for identifying a virtual channel used to transmit a program pertaining to the EIT is described. Upon acquisition of an EIT, the video playback device 120 collates a source_id described in the EIT and a source_id described in a virtual channel entry in a VCT so as to associate the EIT with a virtual channel used to transmit a program pertaining to the EIT.

The following describes details of extended parts of the MGT, the VCT, and the EIT relating to the extended PSIP standard. Data (referred to as an "element" in the present description, and also typically referred to as a "field") included in each of the tables and a meaning of each element are the same as those in the existing PSIP standard unless particularly described.

(2) MGT

The MGT is a table for describing PIDs assigned to respective tables other than a System Time Table (STT).

FIG. 4 shows a data structure of the MGT.

The MGT for 2D and the MGT for 3D have a common data structure.

The extended PSIP standard defines a value corresponding to the VCT for 3D and the EIT for 3D as a table_type. Specifically, the VCT for 3D is assigned for example with a table_type "09x0006" (in the case where current_next_indicator='1') and a table_type "09x0007" (in the case where current_next_indicator='0'). These values of the table_type are not used in the existing PSIP standard. The EITs for 3D (EIT-0 (3D) to EIT-127 (3D)) are respectively assigned with a table_type "0x0180" to a table_type "09x01 FF".

(3) VCT

The VCT is a table for describing a virtual channel entry for each virtual channel.

Figure 5:
FIG. 5 shows a data structure of the VCT.

FIG. 5 shows a data structure of the VCT.

In the VCT, a series of elements and descriptors from a short name to a descriptor shown in FIG. 5 corresponds to a virtual channel entry 501 corresponding to a single virtual channel.

In the extended PSIP standard, the 3D_program_info_descriptor and the 3D_service_location_descriptor are added as descriptors described in the descriptor. The following describes the added descriptors.

(A) 3D_program_info_descriptor

FIG. 6 shows a data structure of the 3D_program_info_descriptor, and details of a 3D_service_type, which is a major element.

The 3D_service_type indicates a provision form of 3D video images transmitted through a virtual channel defined by a virtual channel entry including the descriptor.

A table 610 in FIG. 6 shows a list of values that the 3D_service_type can take and details thereof.

Each row of the table 610 corresponds to one provision form of 3D video images. The first, second, third, and fourth columns of the table 610 respectively indicate a value of the 3D_service_type, a name of a provision form, a video image transmitted through the main transmission path, and a video image transmitted through the other transmission path and a type of the other transmission path.

A form "frame compatible" indicated by a value of the 3D_service_type "0x0" corresponds to the configuration form of 3D video images "frame compatible" as described above.

In the form "frame compatible", 3D video images in the side-by-side format and the top-and-bottom format are transmitted through the main transmission path.

Forms "service compatible: common use type 1" to "service compatible: common use type 5" indicated by values of the 3D_service_type "0x1" to "0x5" correspond to the configuration form of 3D video images "service compatible: common use" as described above.

In the present embodiment, in the forms "service compatible: common use type 1" to "service compatible: common use type 5", legacy 2D video images serve as base-view video images. The legacy 2D video images are encoded using MPEG2 in accordance with the existing ATSC standard. Additional-view video images are encoded, for example, using moving picture experts group 4 advanced video coding (MPEG4 AVC), which has a higher compression efficiency than MPEG2. The forms "service compatible: common use type 1" to "service compatible: common use type 5" differ from one another in a transmission path for the additional-view video images.

In the form "service compatible: common use type 1", the additional-view video images are transmitted through a main transmission path that is the same as the main transmission path for the base-view video images.

In the form "service compatible: common use type 2", the additional-view video images are transmitted through the Internet serving as the other transmission path.

In the form "service compatible: common use type 3", the additional-view video images are transmitted through mobile/handheld broadcasting serving as the other transmission path.

In the form "service compatible: common use type 4", the additional-view video images are transmitted through a storage medium serving as the other transmission path. Specifically, after the video transmission device 110 stores the additional-view video images in a storage medium such as USB memory, the storage medium is carried and connected to the video playback device 120. The video playback device 120 reads the additional-view video images from the storage medium and uses the read additional-view video images for playing back 3D video images.

In the form "service compatible: common use type 5", the additional-view video images are transmitted through another stream serving as the other transmission path. One example of the other stream is a transport stream (TS) that differs from a TS into which legacy 2D video images are multiplexed.

Forms "service compatible: independent 3D type 1" to "service compatible: independent 3D type 5" indicated by values of the 3D_service_type "0x6" to "0xA" correspond to the configuration form of 3D video images "service compatible: independent 3D" as described above.

In the present embodiment, in the form "service compatible: independent 3D", independent 3D video images are prepared separately from legacy 2D video images. In this case, one of two viewpoint images constituting an independent 3D video image serves as a base-view video image. The other one of the two viewpoint images constituting the independent 3D video image serves as an additional-view video image. The independent 3D video images are encoded using moving picture experts group 4 multiview video coding (MPEG4 MVC).

The forms "service compatible: independent 3D type 1" to "service compatible: independent 3D type 5" differ from one another in a transmission path for the additional-view video images.

In the form "service compatible: independent 3D type 1", the additional-view video images are transmitted through a main transmission path that is the same as the main transmission path for the base-view video images.

In the form "service compatible: independent 3D type 2", the additional-view video images are transmitted through the Internet serving as the other transmission path.

In the form "service compatible: independent 3D type 3", the additional-view video images are transmitted through mobile/handheld broadcasting serving as the other transmission path.

In the form "service compatible: independent 3D type 4", the additional-view video images are transmitted through a storage medium serving as the other transmission path.

In the form "service compatible: independent 3D type 5", the additional-view video images are transmitted through another stream serving as the other transmission path.

A form "frame incompatible" indicated by a value of the 3D_service_type "0xB" corresponds to the configuration form of 3D video images "frame incompatible" as described above.

The form "frame incompatible" is a form of transmitting only 3D video images each composed of a base-view video image and an additional-view video image incompatible with a legacy 2D video image. In the form "frame incompatible", base-view video images and additional-view video images are encoded, for example, using MPEG2.

The video playback device 120 can know the transmission form of additional-view video images by acquiring, before playback of 3D video images, the VCT and reading the 3D_service_type from the 3D_program_info_descriptor described in the virtual channel entry relating to the 3D video images in the VCT. When identifying that the additional-view video images are transmitted through the other transmission path, the video playback device 120 can acquire more detailed information for specifying the other transmission path by referring to an ES_location_info described later. The video playback device 120 specifies the other transmission path with reference to information described in the ES_location_info, and receives the additional-view video images through the specified other transmission path. Details of the reception are described later.

(B) 3D_service_location_descriptor

FIG. 7 shows a data structure and major elements of the 3D_service_location_descriptor.

The 3D_service_location_descriptor is set by extending, for 3D use, a service_location_descriptor conforming to the existing PSIP standard. Each element described in the 3D_service_location_descriptor and a meaning of the element are respectively the same as those in the service_location_descriptor unless particularly described.

In FIG. 7, in an entry 710 composed of a series of elements from a stream_type to a frame_rate, information relating to an elementary stream (ES) transmitted by a TS having a TSID indicated by a channel_TSID in the virtual channel entry 501 in the VCT (see FIG. 5) is described.

The entry 710 includes information (entry 711) relating to an ES as a video stream (a stream_type corresponds to a value, such as 0x02 (video stream), indicating the video stream).

The entry 711 includes a horizontal_resolution, a vertical_resolution, and a frame_rate.

In the horizontal_resolution, the vertical_resolution, and the frame_rate, horizontal resolution of video images transmitted as a video stream, vertical resolution of the video images, and a frame rate of the video images are respectively described.

In FIG. 7, in an entry 720 composed of a series of elements from an ES_location to a frame_rate, information relating to an ES transmitted through the other transmission path is described.

In FIG. 7, a number_elements_from_other_path indicates a number of ESs transmitted through the other transmission path. When all ESs are transmitted through the main transmission path, a value "0" is described in the number_elements_from_other_path.

The ES_location and the ES_location_info in the entry 720 are elements not defined in the service_location_descriptor but defined in the extended PSIP standard.

In the ES_location, a value for identifying the other transmission path through which the additional-view video images are transmitted is described. Similar information can be acquired by referring to the 3D_service_type, and thus the description in the ES_location may be omitted.

A table 750 of FIG. 7 shows a list of values that the ES_location can take and details thereof. The ES_location is a 3-bit binary value. As shown in the table 750 of FIG. 7, a value of the ES_location "000" indicates that the other transmission path is the Internet. A value of the ES_location "001" indicates that the other transmission path is mobile/handheld broadcasting. A value of the ES_location "010" indicates that the other transmission path is storage medium. A value of the ES_location "011" indicates that the other transmission path is another stream.

As shown in a table 760, the ES_location_info indicates details of the other transmission path identified by the ES_location.

For example, when the value of the ES_location is "000", a URL of a source of additional-view video images acquired via the Internet is described in the ES_location_info. The video playback device 120 accesses the URL described in the ES_location_info to acquire the additional-view video images.

When the value of the ES_location is "001", information for receiving the mobile/handheld broadcasting, such as information indicating a receive frequency and a channel number, is described in the ES_location_info.

When the value of the ES_location is "010", identification information for identifying the storage medium is described in the ES_location_info. One example of the identification information is a manufacturer's serial number unique to the USB memory.

When the value of the ES_location is "011", information for receiving the other stream, such as information indicating a receive frequency, a channel number, and a TSID, is described in the ES_location_info.

The video playback device 120 acquires, by referring to the ES_location_info, information necessary for receiving the additional-view video images through the other transmission path. The video playback device 120 then acquires, by using the acquired information, the additional-view video images through the other transmission path.

As described above, when an ES received through the other transmission path is a video stream, an entry 721, which is similar to the entry 711, is included in the entry 720. The video playback device 120 uses the horizontal resolution, the vertical resolution, and the frame rate of each of the base-view video images and the additional-view video images known by referring to the entries 711 and 721 as follows.

When the additional-view video images are transmitted through mobile/handheld broadcasting, the resolution (the horizontal resolution and the vertical resolution) of the additional-view video images can be lower than the resolution of the base-view video images, and the frame rate of the additional-view video images can be lower than the frame rate of the base-view video images. In such a case, the base-view video images and the additional-view video images cannot be used as they are to constitute the 3D video images. The video playback device 120, however, can generate 3D video images from the base-view video images and the additional-view video images for playback by referring to the entries 711 and 721 to know the resolution and the frame rate of each of the base-view video images and the additional-view video images, and then by performing compression and extension of one of the base-view video images and the additional-view video images so that the resolution of the one of the base-view video images and the additional-view video images matches the resolution of the other one of the base-view video images and the additional-view video images, or performing processing so that the resolution and the frame_rate of the base-view video images and the additional-view video images match each other.

(4) EIT

The EIT is a table for describing information for each program transmitted through virtual channels.

FIG. 8 shows a data structure of the EIT.

There is no difference between a data structure of the existing EIT for 2D and a data structure of the EIT for 3D conforming to the extended PSIP standard. The extended PSIP standard, however, defines the 2D_3D_channel_linkage_descriptor and the 2D_3D_relationship_descriptor as descriptors in the EIT for 2D and the EIT for 3D. The following describes each of the descriptors.

(A) 2D_3D_channel_linkage_descriptor

The 2D_3D_channel_linkage_descriptor is a descriptor for describing information for linking a virtual channel for transmitting a 2D program (hereinafter, referred to as a "2D virtual channel") and a virtual channel for transmitting a 3D program corresponding to the 2D program (hereinafter, referred to as a "3D virtual channel").

FIG. 9 shows a data structure and major elements of the 2D_3D_channel_linkage_descriptor.

A linkage_direction indicates whether its own EIT is linked to the EIT for 2D or the EIT for 3D. This means that the linkage_direction indicates whether a virtual channel for transmitting a program relating to its own EIT is linked to the virtual channel for transmitting a 2D program or the virtual channel for transmitting a 3D program.

A table 910 of FIG. 9 shows a list of values that the linkage_direction can take and details thereof. As shown in the table 910, a value of the linkage_direction "00" indicates that only the EIT for 3D is transmitted and there is no linked EIT for 2D. In this case, the value also indicates that there is no virtual channel linked to the virtual channel for transmitting a program relating to its own EIT.

A value of the linkage_direction "01" indicates that there is a linked EIT for 3D. In this case, the value also indicates that there is a 3D virtual channel linked to a 2D virtual channel for transmitting a program relating to its own EIT.

A value of the linkage_direction "10" indicates that there is a linked EIT for 2D. In this case, the value also indicates that there is a 2D virtual channel linked to a 3D virtual channel for transmitting a program relating to its own EIT.

As shown in a table 920 of FIG. 9, a TSID of a TS for transmitting a linked EIT is described in a channel_TSID_ref.

As shown in a table 930 of FIG. 9, a source_id for identifying a virtual channel for transmitting a program relating to a linked EIT is described in a source_id_ref.

As shown in a table 940 of FIG. 9, an event_id for identifying a program relating to a linked EIT is described in an event_id_ref.

A table 950 of FIG. 9 shows a list of values that an is_different_physical_channel can take and details thereof. As shown in the table 950, the is_different_physical_channel indicates whether a program relating to an EIT linked to its own EIT is transmitted through a different physical channel (a value "00") or through the same physical channel (a value "01").

By acquiring the 2D_3D_channel_linkage_descriptor, the video playback device 120 can know whether there is a 3D program or a 2D program linked to a 2D program or a 3D program being viewed. As a result, the video playback device 120 can determine whether or not switching between a 2D program and a 3D program is possible, and can display, when the switching is possible, an EPG showing accordingly.

By acquiring the 2D_3D_channel_linkage_descriptor, the video playback device 120 can acquire a TSID to be used to acquire a 2D program or a 3D program relating to a linked EIT, and a source_id and an event_id for specifying an EIT as a linkage destination. By using the information thus acquired, the video playback device 120 can acquire video images for a program relating to the linked EIT through the other transmission path.

(B) 2D_3D_relationship_descriptor

The 2D_3D_relationship_descriptor is a descriptor for describing a video image, from among a plurality of video images, to be used to constitute each of a 2D video image and a 3D video image.

FIG. 10 shows a data structure and major elements of the 2D_3D_relationship_descriptor.

(a) 2D_presentation_allowed

A 2D_presentation_allowed indicates whether or not one of a base-view video image and an additional-view video image constituting a 3D video image is allowed to be displayed as a 2D video image. The 2D_presentation_allowed is used when a video creator creates a 3D video image and a 2D video image separately, considering the characteristics of each of 3D display and 2D display, and it is not desirable that one of the video images constituting the 3D video image be displayed as the 2D video image. One example of a case of prohibiting such display is a case where 2D video images are created so as to frequently change scenes, while 3D video images are created so as to avoid frequent scene changes from the standpoint of preventing eye strain. In this case, displaying, as 2D video images, one of the video images constituting the 3D video images can result in less interesting video images with few scene changes.

A table 1010 of FIG. 10 shows a list of values that the 2D_presentation_allowed can take and details thereof. As shown in the table 1010, a value of the 2D_presentation_allowed "00" indicates that neither 2D display using base-view video images nor 2D display using additional-view video images is allowed. When a value of the 2D_presentation_allowed "01" indicates that 2D display using additional-view video images is allowed. When a value of the 2D_presentation_allowed "10" indicates that 2D display using base-view video images is allowed. A value of the 2D_presentation_allowed "11" indicates that 2D display using base-view video images and 2D display using additional-view video images are both allowed.

(b) Leftview_flag

A leftview_flag indicates whether a base-view video image is used as a left-view video image or a right-view video image constituting a 3D video image.

A table 1020 of FIG. 10 shows a list of values that the leftview_flag can take and details thereof. As shown in the table 1020, a value of the leftview_flag "00" indicates that a base-view video image is a right-view image. A value of the leftview_flag "01" indicates that a base-view video image is a left-view image. A value of the leftview_flag "10" indicates that a base-view video image is neither a left-view image nor a right-view image. By referring to the leftview_flag, the video playback device 120 can determine whether to use a base-view video image as a left-view image or a right-view image when displaying a 3D video image.

(c) Content_identical_status

A content_identical_status indicates whether or not at least one of a base-view video image and an additional-view video image is identical to a legacy 2D video image.

Use of the content_identical_status can accelerate operation of the video playback device 120 to switch from display of 3D video images to display of 2D video images.

The following briefly describes the acceleration of the operation. For example, when the 3D_service_type is the forms "service compatible: independent 3D type 1" to "service compatible: independent 3D type 5", the video playback device 120 causes a decoder for performing decoding using MPEG4 MVC to operate, but does not cause a decoder for performing decoding for 2D display using MPEG2 to operate, from the standpoints of power saving and reduction of an amount of used memory. In order to switch from the display of 3D video images to the display of 2D video images, it is necessary to cause the decoder for performing decoding using MPEG4 MVC to stop operating to release used resources such as memory, and then to initialize the decoder for performing decoding using MPEG2 to start decoding using MPEG2. It takes some time to perform the above-mentioned processing, and thus phenomenon unsuitable for being presented to users, such as pause during video display and a blackout, can occur when a 3D video image is switched to a 2D video image.

For example, however, when a base-view video image included in a 3D video image is allowed to be displayed as a 2D video image, and the video playback device 120 recognizes in advance that such use of the base-view video image is allowed, the video playback device 120 can continue to perform decoding using MPEG4 MVC and to output only the base-view video image included in the 3D video image as the 2D video image. As a result, the display of 3D video images can immediately be switched to the display of 2D video images, and the occurrence of the unsuitable phenomenon as described above can be prevented.

A table 1030 of FIG. 10 shows a list of values that the content_identical_status can take and details thereof. As shown in the table 1030, a value of the content_identical_status "000" indicates that neither a base-view video image nor an additional-view video image is identical to a legacy 2D video image, that is, a 2D version of a video image is transmitted with respect to a base-view video image and an additional-view video image constituting a 3D video image.

A value of the content_identical_status "001" indicates that an additional-view video image is identical to a legacy 2D video image. A value of the content_identical_status "010" indicates that a base-view video image is identical to a legacy 2D video image. A value of the content_identical_status "011" indicates that a base-view video image and an additional-view video image are each identical to a legacy 2D video image. A value of the content_identical_status "100" indicates that neither a base-view video image nor an additional-view video image is identical to a legacy 2D video image, but the base-view video image and the additional-view video image are identical to each other.

(d) Same_contents_length_flag

A same_contents_length_flag indicates whether a 2D program relating to legacy 2D video images and a 3D program relating to independent 3D video images are the same in length or not.

When the 2D program and the 3D program are different in length, there can be a case where switching between programs should not be performed, such as a case where a program as a switching destination has already ended and a case where a display order of content relating to a program as a switching source and content relating to a program as a switching destination is reversed.

Use of this element can avoid the occurrence of unsuitable phenomenon, for example, by continuously displaying video images without performing switching between programs when the 3D program and the 2D program are different in length.

A table 1040 of FIG. 10 shows a list of values that the same_contents_length_flag can take and details thereof. As shown in the table 1040, a value of the same_contents_length_flag "0" indicates that a 2D program relating to legacy 2D video images and a 3D program relating to independent 3D video images are different in length. A value of the same_contents_length_flag "1" indicates that a 2D program relating to legacy 2D video images and a 3D program relating to independent 3D video images are the same in length.

<2. Configuration>

<2-1. Video Transmission Device 110>

The video transmission device 110 provides 2D video images and 3D video images in the provision form indicated by the 3D_service_type described above, and is implemented by an information processing device such as a computer.

Figure 11:
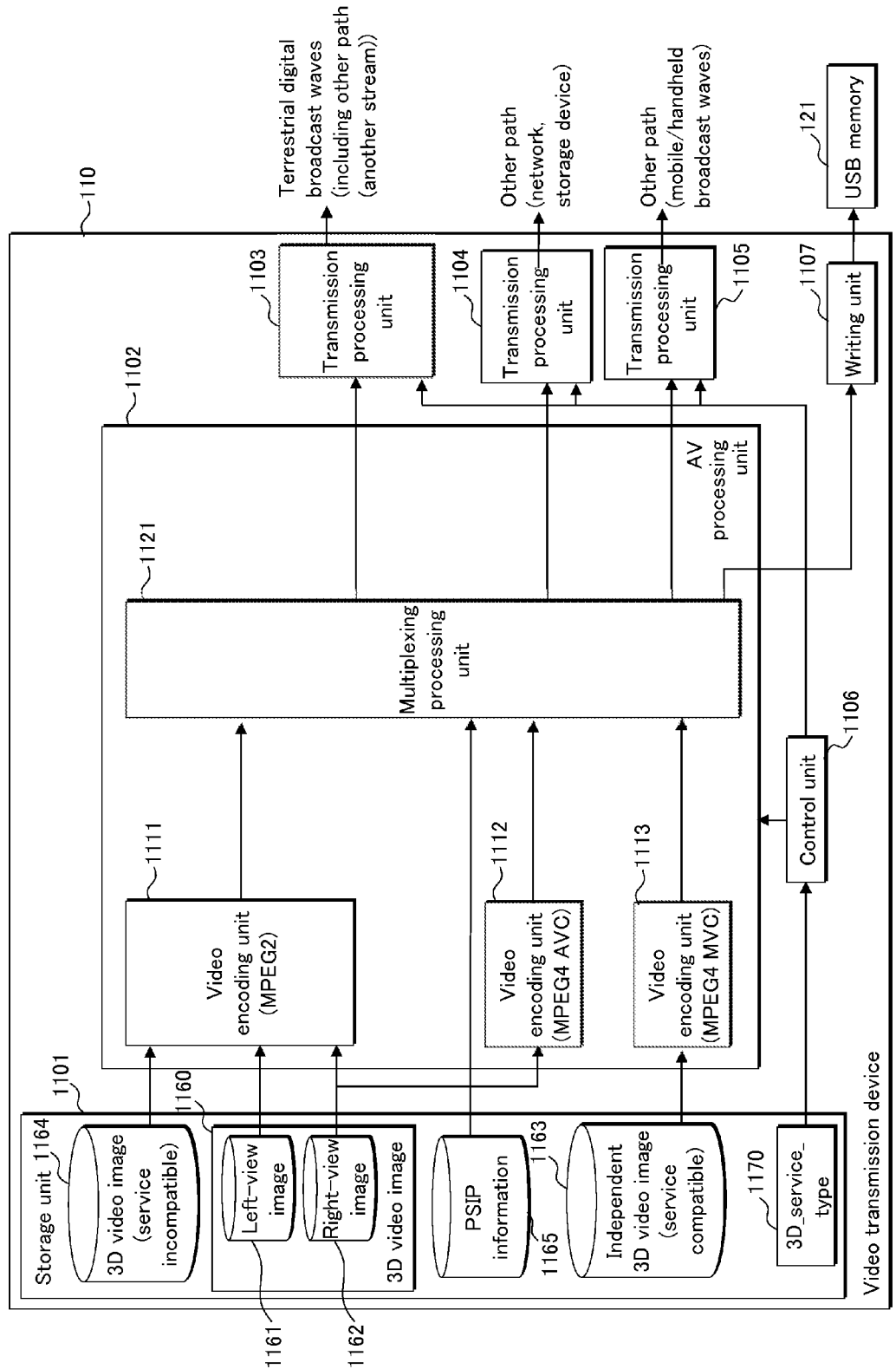
FIG. 11 is a block diagram showing a functional configuration of a video transmission device.

FIG. 11 is a block diagram showing a functional configuration of the video transmission device 110.

As shown in FIG. 11, the video transmission device 110 includes a storage unit 1101, an AV processing unit 1102, a transmission processing unit 1103, a transmission processing unit 1104, a transmission processing unit 1105, a control unit 1106, and a writing unit 1107. USB memory 121, which is a storage medium as the other transmission path, is connected to the writing unit 1107.

(1) Storage Unit 1101

The storage unit 1101 is implemented by a non-volatile storage device.

The storage unit 1101 stores therein a 3D video image 1160, an independent 3D video image 1163, a 3D video image 1164, PSIP information 1165, and a 3D_service_type 1170.

The 3D video image 1160 is a 3D video image in the configuration form "service compatible: common use", and is composed of a left-view image 1161 and a right-view image 1162.

The independent 3D video image 1163 is a 3D video image in the configuration form "service compatible: independent 3D".

The 3D video image 1164 is a 3D video image in the configuration form "service incompatible".

The PSIP information 1165 conforms to the extended ATSC standard, and includes the MGT, the VCT, and the EIT described above. In each descriptor and element of the MGT, the VCT, and the EIT described above, a value corresponding to a provision form when the video playback device 120 provides 3D video images is described.

The 3D_service_type 1170 is data that indicates the same content as the 3D_service_type included in the 3D_program_info_descriptor described above (see Table 610 of FIG. 6). The 3D_service_type 1170 indicates the provision form when the video playback device 120 provides 3D video images.

(2) AV Processing Unit 1102

The AV processing unit 1102 is implemented by an AV processing LSI, and has a function to encode video images and perform multiplexing of streams by being controlled by the control unit 1106. The AV processing unit 1102 includes video encoding units 1111 to 1113, and a multiplexing processing unit 1121.

(A) Video Encoding Unit 1111

The video encoding unit 1111 has a legacy 2D video image encoding function, a frame compatible 3D video image encoding function, and a service incompatible 3D video image encoding function. The following describes each of the functions.

(a) Legacy 2D Video Image Encoding Function

As the legacy 2D video image encoding function, the video encoding unit 1111 generates a video ES by encoding an input legacy 2D video image using MPEG2. The left-view image 1161 is herein identical to the legacy 2D video image. Description of a processing to encode a 2D video image using MPEG2 is omitted, as it is well known.

(b) Frame Compatible 3D Video Image Encoding Function

As the frame compatible 3D video image encoding function, the video encoding unit 1111 encodes a base-view video image and an additional-view video images as input using MPEG2 Video to convert the input video images into a video ES in the side-by-side format or the top-and-bottom format. Description of a processing to generate a video ES in the side-by-side format or the top-and-bottom format from a base-view video image and an additional-view video image is omitted, as it is well known.

(c) Service Incompatible 3D Video Image Encoding Function

As the service incompatible 3D video image encoding function, the video encoding unit 1111 encodes a base-view video image and an additional-view video image constituting a 3D video image as input using MPEG2 to generate a video ES obtained by encoding the base-view video image and a video ES obtained by encoding the additional-view video image.

(B) Video Encoding Unit 1112

The video encoding unit 1112 has a function to generate a video ES by encoding an input 2D video image using MPEG4 AVC. Description of a processing to encode a 2D video image using MPEG4 AVC is omitted, as it is well known.

(C) Video Encoding Unit 1113

The video encoding unit 1113 has a function to generate a video ES by encoding an input 3D video image using MPEG4 MVC. Description of a processing to encode a 3D video image using MPEG4 MVC is omitted, as it is well known.

(D) Multiplexing Processing Unit 1121

The multiplexing processing unit 1121 has a function to generate a TS by converting an input video ES into a packetized elementary stream (PES), divides the PES into TS packets, and multiplexing the TS packets, including the PSIP information 1165. Description of the multiplexing is omitted, as it is well known.

(3) Transmission Processing Unit 1103

The transmission processing unit 1103 includes a communication LSI for transmitting streams by using terrestrial digital broadcast waves, and an antenna for transmitting broadcast waves. The transmission processing unit 1103 has a function to modulate an input stream and transmit the modulated input stream by using terrestrial digital broadcast waves. Description of a processing to transmit an input stream by using terrestrial digital broadcast waves is omitted, as it is well known.

(4) Transmission Processing Unit 1104

The transmission processing unit 1104 is implemented by a communication LSI for transmitting and receiving data via a network. The transmission processing unit 1104 has a function to transmit an input stream to a communication destination (the video playback device 120 in the present embodiment) designated by the control unit 1106 via a network. The video transmission device 110 is assigned with a URL, and the URL is described in the ES_location_info described above. The video playback device 120 specifies the video transmission device 110 by using the URL described in the ES_location_info. Description of a processing to transmit and receive data (mainly a stream in the present embodiment) via a network is omitted, as it is well known.

(5) Transmission Processing Unit 1105

The transmission processing unit 1105 is implemented by a communication LSI for conducting mobile/handheld broadcasting. The transmission processing unit 1105 has a function to modulate an input stream and transmit the modulated input stream by using mobile/handheld broadcast waves. Description of a processing to transmit an input stream by using mobile/handheld broadcast waves is omitted, as it is well known.

(6) Control Unit 1106

The control unit 1106 includes a processor and memory. The control unit 1106 has a function to control the whole operation of the video transmission device 110. The function of the control unit 1106 is achieved by the processor executing a program stored in the memory.

The control unit 1106 has, as major functions, an encoding instructing function, an upstream processing unit instructing function, and a transmission instructing function. The following describes each of the functions.

Figure 14:
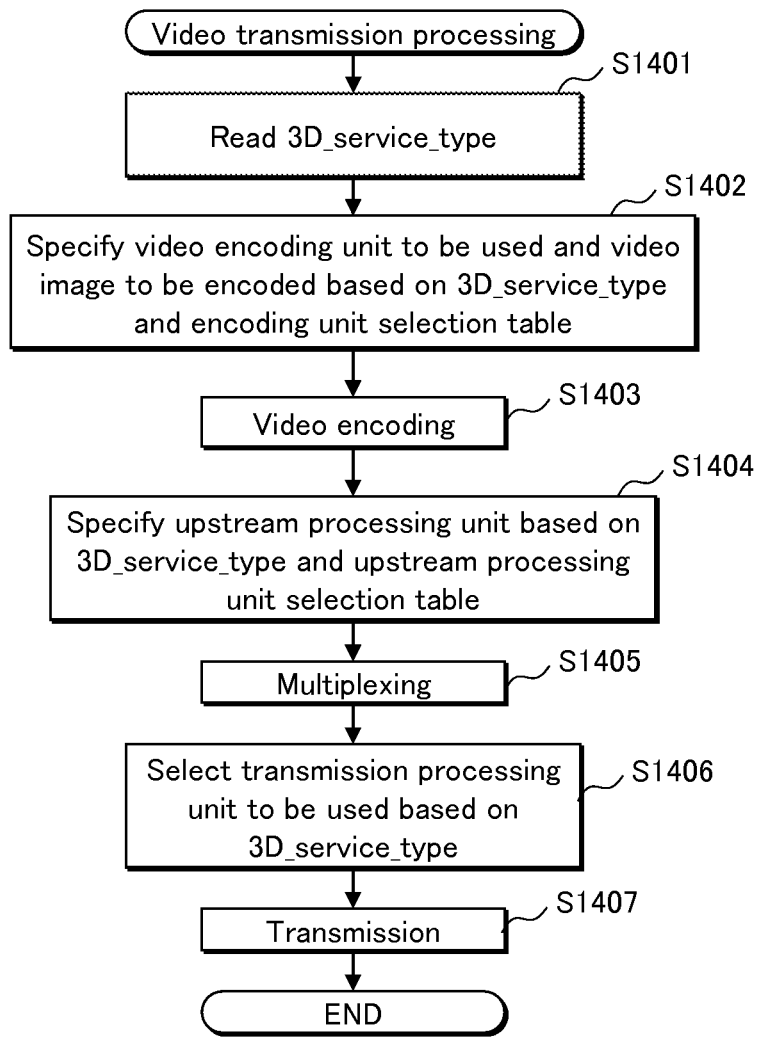
FIG. 14 is a flow chart showing steps of a video transmission processing.

(A) Encoding Instructing Function (see step S1402 in FIG. 14)

As the encoding instructing function, the control unit 1106 instructs the AV processing unit 1102 to encode any of video images stored in the storage unit 1101 by using a corresponding one of the video encoding units 1111 to 1113, with reference to the 3D_service_type 1170 and an encoding unit selection table.

FIG. 12A shows one example of the encoding unit selection table.

As shown in FIG. 12A, the encoding unit selection table shows correspondences among a value of the 3D_service_type, a video image encoded by the video encoding unit 1111, a video image encoded by the video encoding unit 1112, and a video image encoded by the video encoding unit 1113.

For example, when the value of the 3D_service_type is "0x0", the "3D video image 1160" is shown in a corresponding "video encoding unit 1111" section in the encoding unit selection table. The video encoding units 1112 and 1113 are not operated, which is expressed by a cross "×" in FIG. 12A. In this case, the control unit 1106 instructs the AV processing unit 1102 to encode the 3D video image 1160 by using the video encoding unit 1111.

(B) Upstream Processing Unit Instructing Function (see step S1404 in FIG. 14)

As the upstream processing unit instructing function, the control unit 1106 selects a processing unit (hereinafter, referred to as an "upstream processing unit") for outputting a stream targeted for multiplexing to the multiplexing processing unit 1121, with reference to the 3D_service_type 1170 and an upstream processing unit selection table. The control unit 1106 then instructs the AV processing unit 1102 to multiplex the stream received from the selected upstream processing unit.

FIG. 12B shows one example of the upstream processing unit selection table.

As shown in FIG. 12B, the upstream processing unit selection table shows correspondences among a value of the 3D_service_type, an upstream processing unit located upstream of the multiplexing processing unit 1121, and whether re-multiplexing is required or not.

For example, when the value of the 3D_service_type is "0x0", a corresponding upstream processing unit located upstream of the multiplexing processing unit 1121 shown in the upstream processing unit selection table is the "video encoding unit 1111 (3D video image 1160)", and re-multiplexing is not required, which is expressed by a cross "×" in FIG. 12B. A circle "o" in FIG. 12B indicates that re-multiplexing is required. When the value of the 3D_service_type is "0x0", the control unit 1106 instructs the AV processing unit 1102 to multiplex a stream output from the video encoding unit 1111 by using the multiplexing processing unit 1121.

When re-multiplexing is required, the control unit 1106 instructs the AV processing unit 1102 to multiplex each of two streams received from respective two upstream processing units and then to re-multiplex the multiplexed two streams into one TS.

Although the AV processing unit 1102 is described to encode and multiplex only a video ES, the AV processing unit 1102 encodes and multiplexes an audio and subtitle data corresponding to the video as needed, as in typical encoding and multiplexing using MPEG.

(C) Transmission Instructing Function (see step S1406 in FIG. 14)

As the transmission instructing function, the control unit 1106 selects a transmission processing unit to be used, based on the read 3D_service_type, and instructs the selected transmission processing unit to transmit a stream.

(7) Writing Unit 1107

The writing unit 1107 has a function to write data to USB memory. The USB memory to be used and the data to be written are designated by the control unit 1106. In the present embodiment, the control unit 1106 designates, as the USB memory to which the data is written, the USB memory 121 having identification information described in the ES_location_info.

<2-2. Video Playback Device 120>

The video playback device 120 receives and plays back 2D video images and 3D video images provided in the provision form indicated by the 3D_service_type described above. The video playback device 120 is implemented by a digital television.

Figure 13:
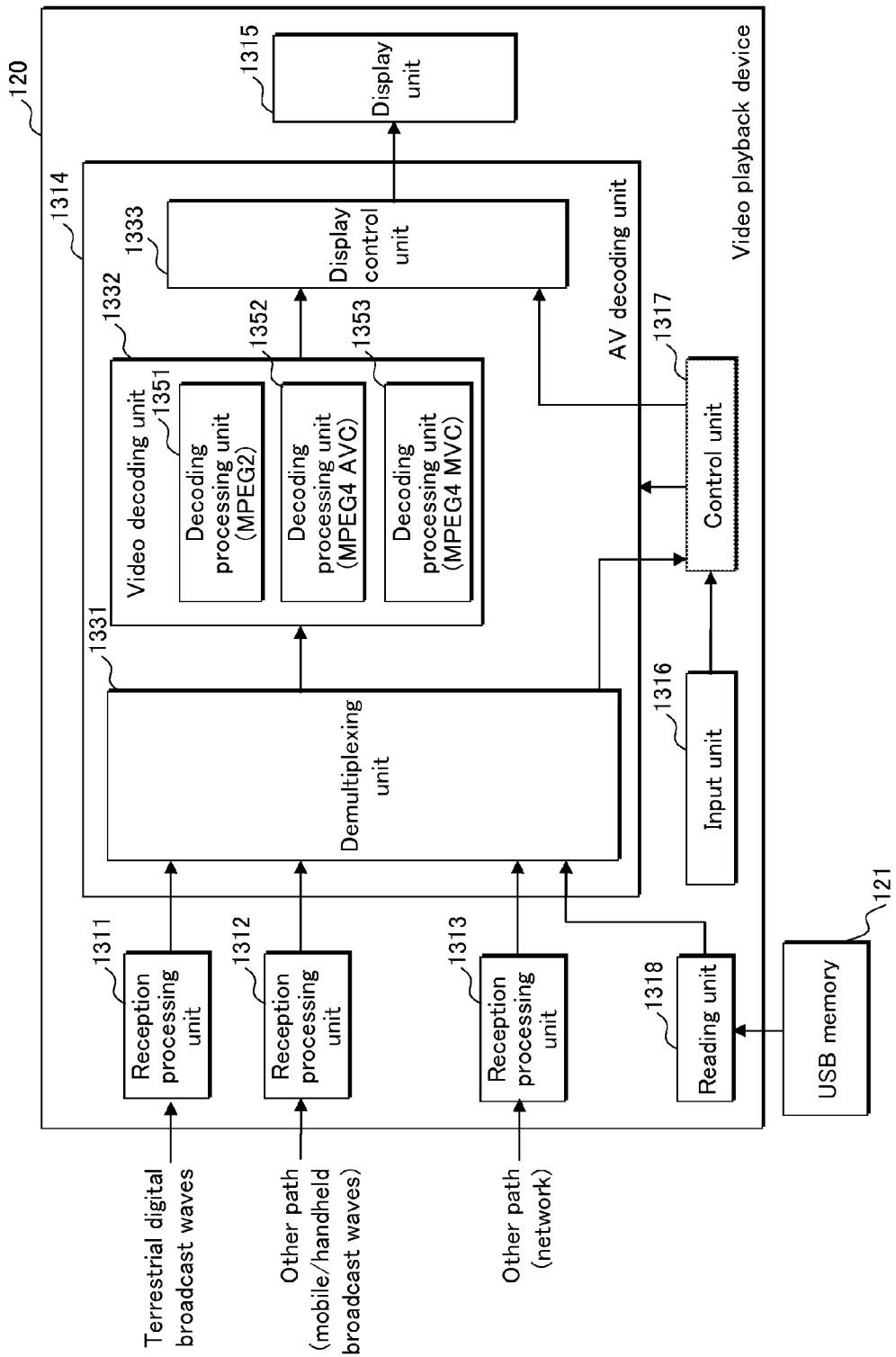
FIG. 13 is a block diagram showing a functional configuration of a video playback device.

FIG. 13 is a block diagram showing a functional configuration of the video playback device 120.

As shown in FIG. 13, the video playback device 120 includes a reception processing unit 1311, a reception processing unit 1312, a reception processing unit 1313, an AV decoding unit 1314, a display unit 1315, an input unit 1316, a control unit 1317, and a reading unit 1318.

(1) Reception Processing Unit 1311

The reception processing unit 1311 is implemented by a tuner for receiving terrestrial digital broadcast waves. The reception processing unit 1311 has a function to extract a TS by receiving and demodulating terrestrial digital broadcast waves, and output the extracted TS. In the present embodiment, the reception processing unit 1311 outputs the extracted TS to the AV decoding unit 1314. Description of the reception and demodulation of terrestrial digital broadcast waves is omitted, as they are well known.

(2) Reception Processing Unit 1312

The reception processing unit 1312 is implemented by a tuner for receiving mobile/handheld broadcast waves. The reception processing unit 1312 has a function to extract a TS by receiving and demodulating mobile/handheld broadcast waves, and output the extracted TS. In the present embodiment, the reception processing unit 1312 outputs the extracted TS to the AV decoding unit 1314. Description of the reception and demodulation of mobile/handheld broadcast waves is omitted, as they are well known.

(3) Reception Processing Unit 1313

The reception processing unit 1313 is implemented by a communication LSI for transmitting and receiving data via a network. The reception processing unit 1313 has a function to receive a TS via a network and output the received TS. In the present embodiment, the reception processing unit 1313 outputs the received TS to the AV decoding unit 1314. Description of a method for transmitting and receiving data by using a network is omitted, as it is well known.

(4) AV Decoding Unit 1314

The AV decoding unit 1314 is implemented by an AV processing LSI. The AV decoding unit 1314 has a function to play back a video by using an input TS. As shown in FIG. 13, the AV decoding unit 1314 includes a demultiplexing unit 1331, a video decoding unit 1332, and a display control unit 1333.

(A) Demultiplexing Unit 1331

The demultiplexing unit 1331 is implemented by a demultiplexer. The demultiplexing unit 1331 demultiplexes an input TS to extract a video ES and PSIP information from the input TS and outputs the extracted video ES and PSIP information. The demultiplexing unit 1331 outputs the extracted video ES to the video decoding unit 1332, and outputs the extracted PSIP information to the control unit 1317. Description of a processing to demultiplex a TS is omitted, as it is well known.

(B) Video Decoding Unit 1332

The video decoding unit 1332 is implemented by a decoding circuit for decoding a video ES. The video decoding unit 1332 has a function to decode the video ES to generate and output video signals representing 2D video images and 3D video images. The video decoding unit 1332 outputs the generated video signals to the display control unit 1333.

The video decoding unit 1332 includes a decoding processing unit 1351, a decoding processing unit 1352, and a decoding processing unit 1353.

The decoding processing unit 1351 has a function to decode a video ES having been encoded using MPEG2 to generate video signals. Description of a processing to decode a video ES having been encoded using MPEG2 is omitted, as it is well known.

The decoding processing unit 1352 has a function to decode a video ES having been encoded using MPEG4 AVC to generate video signals. Description of a processing to decode a video ES having been encoded using MPEG4 AVC is omitted, as it is well known.

The decoding processing unit 1353 has a function to decode a video ES having been encoded using MPEG4 MVC. Description of a processing to decode a video ES having been encoded using MPEG4 MVC is omitted, as it is well known.

One of the decoding processing units 1351, 1352, and 1353, which are included in the video decoding unit 1332, used to decode a video ES is designated by the control unit 1317.

(C) Display Control Unit 1333

The display control unit 1333 is implemented by a display control circuit for generating and outputting a signal (hereinafter, referred to as a "screen display signal") for displaying a video image on a display screen. The display control unit 1333 has a function to generate and output the screen display signal by superimposing an input video signal onto a signal representing an EPG image. When the signal representing the EPG image is not input, the video signal is identical to the screen display signal. The display control unit 1333 outputs the screen display signal to the display unit 1315.

(5) Display Unit 1315

The display unit 1315 includes a display screen. The display unit 1315 has function to display, on the display screen, a video image represented by the screen display signal as input.

(6) Input Unit 1316

The input unit 1316 includes a remote control, a light receiving unit for receiving a remote control signal, and an input device such as a keypad. The input unit 1316 has a function to receive a user instruction input upon operation of the remote control and the keypad by a user, and notify the control unit 1317 accordingly.

(7) Control Unit 1317

The control unit 1317 includes a processor and memory. The control unit 1317 has a function to control the whole operation of the video playback device 120. The function of the control unit 1317 is achieved by the processor executing a program stored in the memory.

The control unit 1317 has, as major functions, an EPG display control function, a 3D video image playback control function, and a video image switching control function. The EPG display control function is a function to perform control to generate and display an image to be displayed as an EPG (see FIGS. 15 and 16). The 3D video image playback control function is a function to perform control to play back 3D video images (see FIG. 17). The video image switching control function is a function to perform control to switch between display of 3D video images and display of 2D video images (see FIGS. 18 and 19).

(8) Reading Unit 1318

The reading unit 1318 has a function to read data from USB memory. The USB memory to be used is designated by the control unit 1317. In the present embodiment, the control unit 1317 designates, as the USB memory from which the data is read, the USB memory 121 having the identification information described in the ES_location_info.

<3. Operation>

<3.1. Video Transmission Processing Performed by Video Transmission Device 110>

The following describes a video transmission processing performed by the video transmission device 110 having the above-mentioned configuration, with reference to the drawings.

FIG. 14 is a flow chart showing steps of the video transmission processing.

The control unit 1106 included in the video transmission device 110 reads, from the storage unit 1101, the 3D_service_type 1170 relating to a 3D video image to be transmitted (step S1401).

The control unit 1106 specifies a video encoding unit to be used and a video image to be encoded by the specified video encoding unit based on the read 3D_service_type and the encoding unit selection table (step S1402). The control unit 1106 issues an instruction to encode the specified video image by using the specified video encoding unit.

Specifically, when the value of the 3D_service_type is "0x0", the control unit 1106 instructs the AV processing unit 1102 to encode the 3D video image 1160 by using the video encoding unit 1111. When the value of the 3D_service_type is "0x1" to "0x5", the control unit 1106 instructs the AV processing unit 1102 to encode the left-view image 1161 as a base-view video image by using the video encoding unit 1111 and to encode the right-view image 1162 as an additional-view video image by using the video encoding unit 1112. When the value of the 3D_service_type is "0x6" to "0xA", the control unit 1106 instructs the AV processing unit 1102 to encode the left-view image 1161 as a legacy 2D video image by using the video encoding unit 1111 and to encode the independent 3D video image 1163 by using the video encoding unit 1113. When the value of the 3D_service_type is "0xB", the control unit 1106 instructs the AV processing unit 1102 to encode the 3D video image 1164 by using the video encoding unit 1111.

The AV processing unit 1102 reads the video image designated by the control unit 1106 from the storage unit 1101, and encodes the read video image by using the specified video encoding unit (step S1403).

The control unit 1106 then specifies the upstream processing unit based on the read 3D_service_type and the upstream processing unit selection table (step S1404). The control unit 1106 instructs the AV processing unit 1102 to multiplex a stream input from the specified upstream processing unit by using the multiplexing processing unit 1121.

Specifically, when the value of the 3D_service_type is "0x0", the control unit 1106 instructs the AV processing unit 1102 to multiplex a stream output from the video encoding unit 1111.

When the value of the 3D_service_type is "0x1", the control unit 1106 instructs the AV processing unit 1102 to multiplex a stream output from the video encoding unit 1111. Separately from the above-mentioned multiplexing, the control unit 1106 instructs the AV processing unit 1102 to multiplex a stream output from the video encoding unit 1112 by using the multiplexing processing unit 1121. The control unit 1106 further instructs the AV processing unit 1102 to multiplex the two multiplexed streams (re-multiplexing).

When the value of the 3D_service_type is "0x2" to "0x5", the control unit 1106 instructs the AV processing unit 1102 to multiplex a stream output from the video encoding unit 1111. Separately from the above-mentioned multiplexing, the control unit 1106 instructs the AV processing unit 1102 to multiplex a stream output from the video encoding unit 1112.

When the value of the 3D_service_type is "0x6", the control unit 1106 instructs the AV processing unit 1102 to multiplex a stream (a stream relating to legacy 2D video images) output from the video encoding unit 1111. Separately from the above-mentioned multiplexing, the control unit 1106 instructs the AV processing unit 1102 to multiplex each of streams (each of two streams constituting an independent 3D video image) output from the video encoding unit 1113. The control unit 1106 further instructs the AV processing unit 1102 to multiplex the two multiplexed streams (re-multiplexing).

When the value of the 3D_service_type is "0x7" to "0xA", the control unit 1106 instructs the AV processing unit 1102 to multiplex a stream (a stream relating to legacy 2D video images) output from the video encoding unit 1111. Separately from the above-mentioned multiplexing, the control unit 1106 instructs the AV processing unit 1102 to multiplex each of streams (each of two streams constituting an independent 3D video image) output from the video encoding unit 1113.

When the value of the 3D_service_type is "0xB", the control unit 1106 instructs the AV processing unit 1102 to multiplex each of two streams output from the video encoding unit 1111. The control unit 1106 further instructs the AV processing unit 1102 to multiplex the two multiplexed streams (re-multiplexing).

The AV processing unit 1102 multiplexes each stream output from the upstream processing unit in accordance with the instructions from the control unit 1106 (step S1405).

The multiplexing processing unit 1121 reads, from the storage unit 1101, the PSIP information 1165 in which a value of each element is set in accordance with the value of the 3D_service_type, and multiplexes the read PSIP information 1165. The multiplexing processing unit 1121 also multiplexes data multiplexed in broadcasting conforming to the existing ATSC standard, such as an audio stream and a subtitle stream.

The control unit 1106 then selects a transmission processing unit to be used based on the read 3D_service_type, and instructs the selected transmission processing unit to transmit an input stream (step S1406).

Specifically, when the value of the 3D_service_type is "0x0", "0x1", "0x6", and "0xB", the control unit 1106 instructs the transmission processing unit 1103 to receive and transmit a stream in which 3D video images have been encoded and multiplexed and which is output from the multiplexing processing unit 1121.

When the value of the 3D_service_type is "09x2" to "09x5" and "09x7" to "0xA", the control unit 1106 instructs the transmission processing unit 1103 to receive and transmit a stream in which base-view video images have been encoded and multiplexed and which is output from the multiplexing processing unit 1121.

When the value of the 3D_service_type is "09x5" and "0xA", the control unit 1106 instructs the transmission processing unit 1103 to receive and transmit a stream (the "other stream" described above) in which additional-view video images have been encoded and multiplexed and which is output from the multiplexing processing unit 1121.

When the value of the 3D_service_type is "09x2" and "09x7", the control unit 1106 instructs the transmission processing unit 1104 to receive and transmit the stream in which additional-view video images have been encoded and multiplexed and which is output from the multiplexing processing unit 1121. When the value of the 3D_service_type is "09x4" and "09x9", a user of the video transmission device 110 and a user of the video playback device 120 agree in advance that the video transmission device 110 stores video images in a storage medium (e.g. the USB memory 121) identified by the identification information described in the ES_location_info, and the storage medium is carried and attached to the video playback device 120 manually. The video images are transferred from the video transmission device 110 to the video playback device 120 via the storage medium in accordance with the agreement. Specifically, the control unit 1106 causes the writing unit 1107 to write additional-view video images into the USB memory 121 before transmission of base-view video images for advance storage. The USB memory 121 is carried and attached to the video playback device 120 manually.

When the value of the 3D_service_type is "09x3" and "09x8", the control unit 1106 instructs the transmission processing unit 1105 to receive and transmit the stream in which additional-view video images have been encoded and multiplexed and which is output from the multiplexing processing unit 1122.

The transmission processing units 1103 to 1105 transmit respective streams designated by the control unit 1106 (step S1407).

<3.2. EPG Display Processing Performed by Video Playback Device>

The following describes an EPG display processing performed by the video playback device 120 having the above-mentioned configuration, with reference to the drawings.

Figure 15:
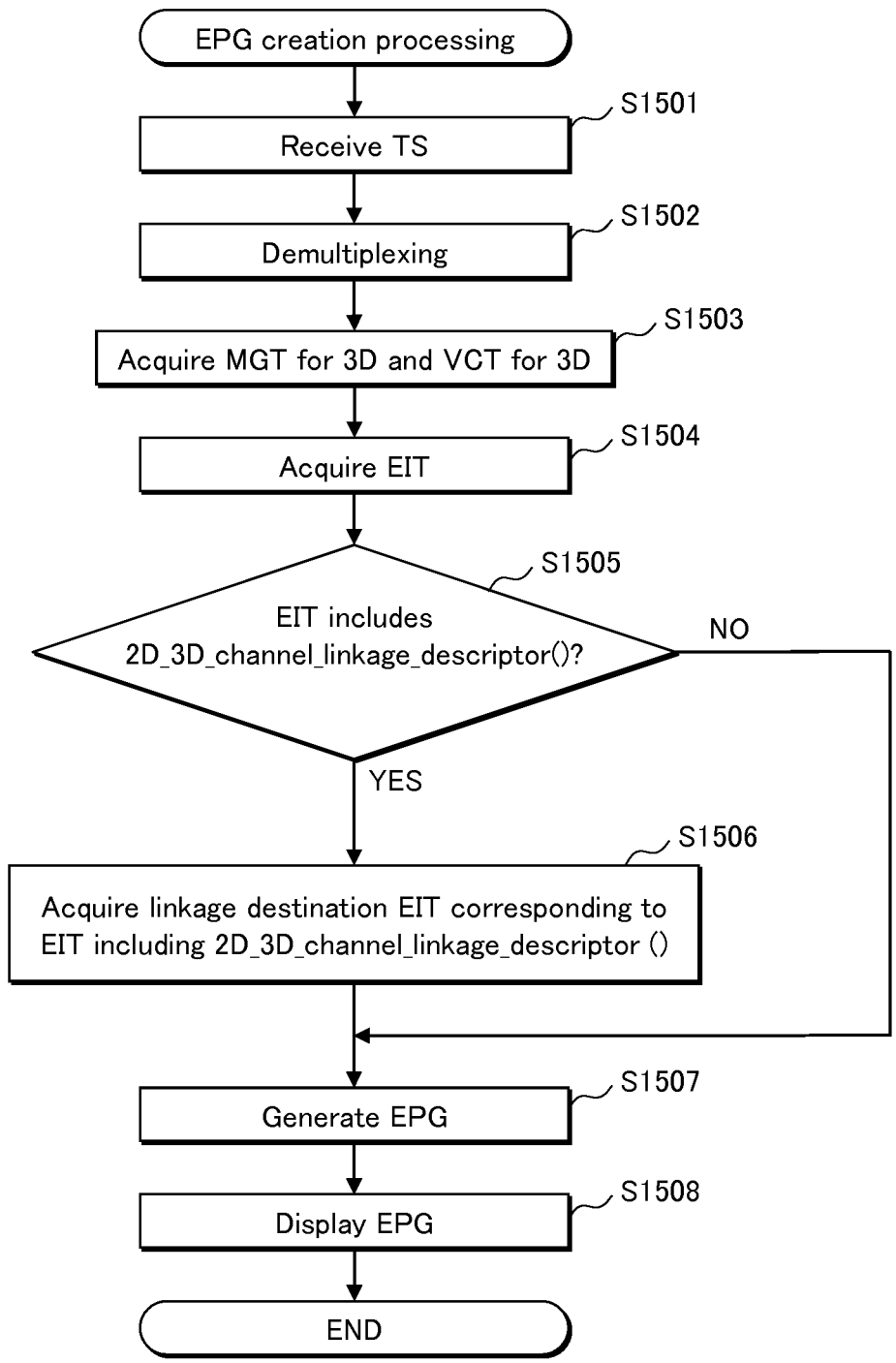
FIG. 15 is a flow chart showing steps of an EPG creation processing.

FIG. 15 is a flow chart showing steps of an EPG creation processing.

The EPG display processing is achieved mainly by the control unit 1317 performing control as the EPG display control function shown in FIG. 15.

The EPG display is performed on the assumption that the video playback device 120 has acquired a TS. This means that, in the video playback device 120, the reception processing unit 1311 has extracted the TS by receiving and demodulating terrestrial digital broadcast waves (step S1501), and the demultiplexing unit 1331 has demultiplexed the TS (step S1502).

The control unit 1317 then instructs the demultiplexing unit 1331 to extract a packet having the PID "0x1FF6" from the TS (step S1503). By extracting the packet having the PID "0x1FF6" from the TS, the demultiplexing unit 1331 acquires the MGT for 3D and the VCT for 3D. The demultiplexing unit 1331 transmits the acquired MGT for 3D and VCT for 3D to the control unit 1317. The MGT for 3D and the VCT for 3D are each identified by a table ID (a table ID "0xC7" in the case of the MGT for 3D, and a table ID "0xC8" in the case of the VCT for 3D).

The control unit 1317 acquires a PID of the EIT for 2D and a PID of the EIT for 3D described in the MGT for 3D, with reference to the MGT for 3D. The control unit 1317 acquires a virtual channel entry relating to each virtual channel for transmitting a 2D program and a 3D program, with reference to the VCT for 3D.

The control unit 1317 instructs the demultiplexing unit 1331 to extract the EIT for 2D and the EIT for 3D by using the PID of the EIT for 2D and the PID of the EIT for 3D acquired in step S1503 (step S1504). The demultiplexing unit 1331 extracts the EIT for 2D and the EIT for 3D from the TS in accordance with the instruction, and transmits the extracted EIT for 2D and EIT for 3D to the control unit 1317.

The control unit 1317 collates a source_id described in each EIT and a source_id described in a corresponding virtual channel entry. When they match, the control unit 1317 associates information relating to a program represented by the EIT with a virtual channel entry relating to a virtual channel for transmitting the program.

In the EIT, information (e.g. a start time, duration, and a program title) relating to the program is described. In the virtual channel entry, information (e.g. a virtual channel name, a main channel number, and a sub-channel number) defining the virtual channel is described.

Figure 16:
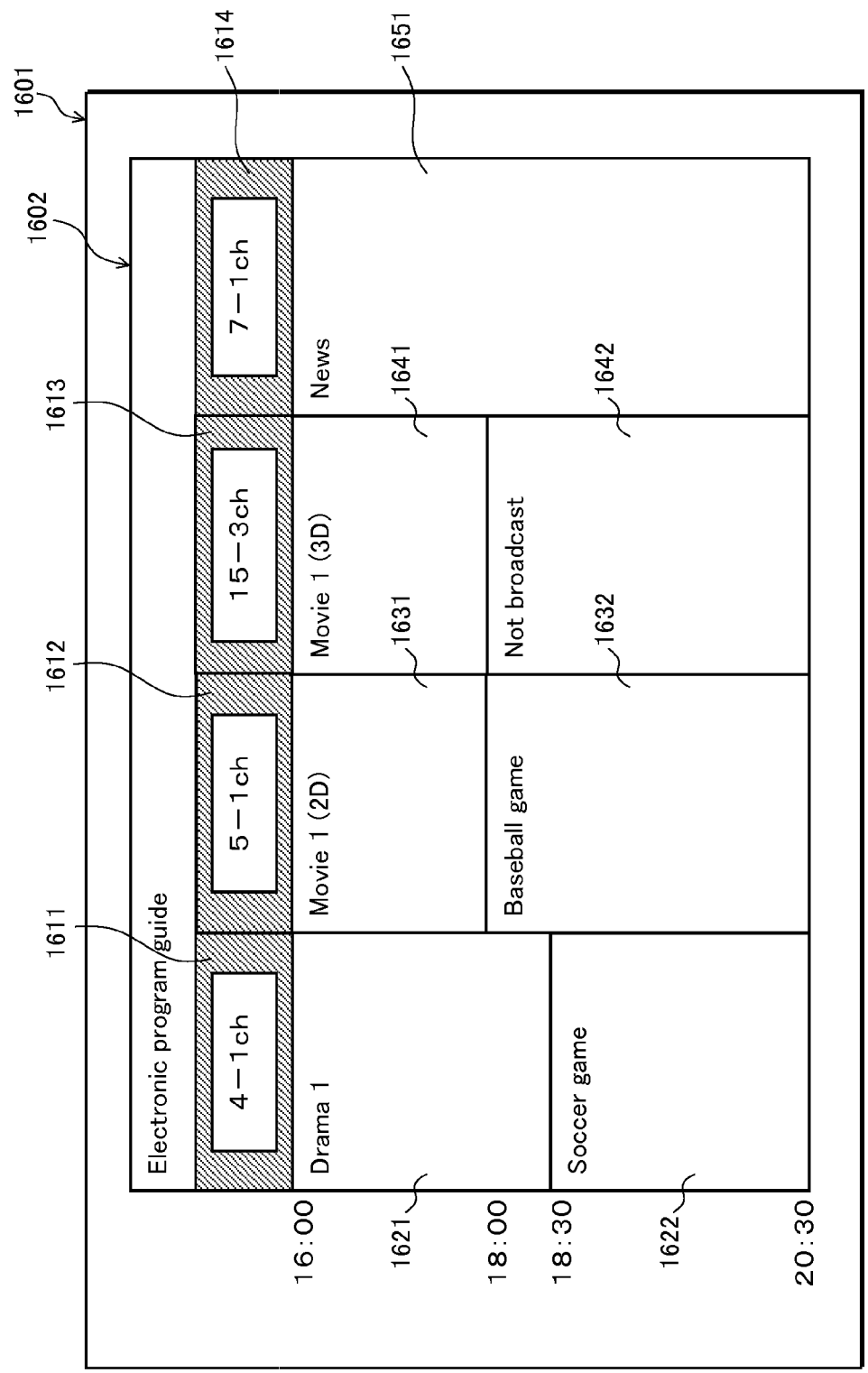
FIG. 16 shows an example of an EPG.

By using the information pieces described above, the control unit 1317 can generate an EPG image 1601 showing an electronic program guide 1602 as illustrated in FIG. 16, for example.

Each column of the electronic program guide 1602 corresponds to a different one of virtual channels. In each column, information pieces on programs transmitted through the corresponding virtual channel are arranged in chronological order.

Images 1611 to 1614 represent channel numbers of the respective virtual channels. A channel number of each virtual channel is a combination of a main channel number and a sub-channel number. For example, a channel number "4-1ch" of a virtual channel represented by the image 1611 is a combination of a main channel number "4" and a sub-channel number "1".

Each of images 1621, 1622, 1631, 1632, 1641, 1642, and 1651 represents information relating to a corresponding program. In each of these images, a program title and the like are described.

For example, the image 1621 represents a program whose title, start time, and duration are respectively "drama 1", "16:00", and "two hours".

Programs represented by the images 1621 and 1622 are transmitted through the virtual channel whose channel number is "4-1ch", and thus the images 1621 and 1622 are arranged under the image 1611 in chronological order.

The description of the electronic program guide is once ended, and FIG. 15 is described again.

In step S1505, the control unit 1317 determines whether each of the acquired EIT for 2D and EIT for 3D includes the 2D_3D_channel_linkage_descriptor or not (step S1505).

Including the 2D_3D_channel_linkage_descriptor in each of the acquired EIT for 2D and EIT for 3D (YES in step S1505) means that the EIT (hereinafter, referred to as a "linkage source EIT") including the 2D_3D_channel_linkage_descriptor is linked to another EIT (hereinafter, referred to as a "linkage destination EIT"). In this case, the control unit 1317 acquires the linkage destination EIT (step S1506).

The control unit 1317 acquires an EIT identified by a TSID indicated by the channel_TSID_ref, a source_id indicated by the source_id_ref, and an event_id indicated by the event_id_ref, which are included in the 2D_3D_channel_linkage_descriptor, by using the reception processing unit 1311 and the demultiplexing unit 1331. The linkage destination EIT identified by the TSID, the source_id, and the event_id is acquired by performing a similar processing to that shown in steps S1501 to S1504.

The control unit 1317 generates an EPG image (e.g. the EPG image 1601 shown in FIG. 16 described above) based on the information acquired in the above-mentioned steps (step S1507). The control unit 1317 outputs the EPG image to the display control unit 1333.

The display control unit 1333 generates a video signal representing the EPG image, and outputs the video signal to the display unit 1315 (step S1508). The display unit 1315 displays the EPG image 1601 on the display screen.

The EPG image 1601 includes a column relating to a virtual channel (e.g. a virtual channel whose virtual channel number is 5-1 ch) including the linkage source EIT and a column pertaining to a virtual channel (e.g. a virtual channel whose virtual channel number is 15-3ch) including the linkage destination EIT. As a result, a user can see at a glance that a given program (e.g. a program "movie 1 (2D)") is linked to another program (e.g. a program "movie 1 (3D)"), thereby leading to enhancement of the convenience of the user.

<3.3. 3D Video Image Playback Processing Performed by Video Playback Device>

Figure 17:
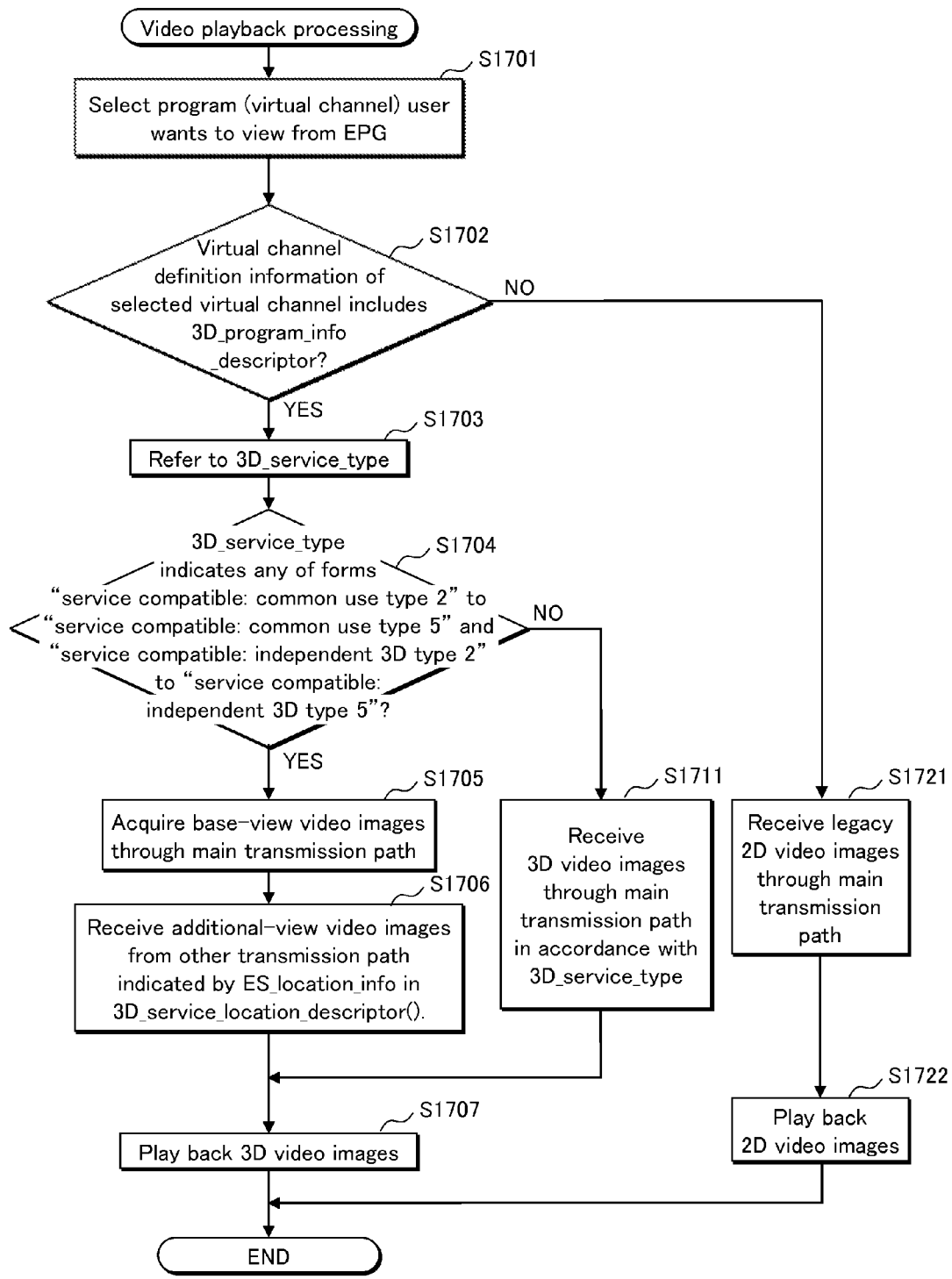
FIG. 17 is a flow chart showing steps of a video playback processing performed by the video playback device.

FIG. 17 is a flow chart showing steps of a video playback processing performed by the video playback device 120.

Assume that the video playback device 120 has displayed the EPG image as shown in FIG. 16. A user inputs, by using the input unit 1316, an instruction specifying a program that the user wants to view from among programs whose information pieces are described in the electronic program guide 1602 (step S1701).

In accordance with the EIT and the VCT relating to the specified program, the control unit 1317 specifies the program specified by the user and a virtual channel for transmitting the program.

The control unit 1317 determines whether or not a virtual channel entry defining the specified virtual channel includes the 3D_program_info_descriptor, with reference to the VCT (step S1702).

When the control unit 1317 determines that the 3D_program_info_descriptor is not included (NO in step S1702), the video transmission device 110 has not transmitted 3D video images and has only transmitted legacy 2D video images. The control unit 1317 thus receives the legacy 2D video images by using the reception processing unit 1311, the AV decoding unit 1314, and the display unit 1315 (step S1721) and plays back the legacy 2D video images (step S1722). Description of technology for receiving the legacy 2D video images by using terrestrial digital broadcast waves and playing back the received legacy 2D video images is omitted, as they are well known.

When the control unit 1317 determines that the 3D_program_info_descriptor is included (YES in step S1702), the control unit 1317 refers to the 3D_service_type described in the 3D_program_info_descriptor (step S1703).

The control unit 1317 determines whether or not the 3D_service_type indicates any of the forms "service compatible: common use type 2" to "service compatible: common use type 5" and "service compatible: independent 3D type 2" to "service compatible: independent 3D type 5" (step S1704).

When the 3D_service_type indicates any of the forms "service compatible: common use type 2" to "service compatible: common use type 5" and "service compatible: independent 3D type 2" to "service compatible: independent 3D type 5" (YES in step S1704), the control unit 1317 performs control to acquire base-view video images through a main transmission path based on the virtual channel entry defining the specified virtual channel (step S1705). For example, the control unit 1317 instructs the reception processing unit 1311 to receive broadcast waves for transmitting the base-view video images based on information described in the virtual channel entry, such as elements modulation_mode, carrier_frequency, and channel_TSID. The control unit 1317 also instructs the AV decoding unit 1314 to use the decoding processing unit 1351 (in the cases of the forms "service compatible: common use type 2" to "service compatible: common use type 5") or the decoding processing unit 1353 (in the cases of the forms "service compatible: independent 3D type 2" to "service compatible: independent 3D type 5") to decode the base-view video images.

The control unit 1317 performs control to receive additional-view video images from the other transmission path (step S1706).

Specifically, the control unit 1317 acquires information on details of the other transmission path with reference to the ES_location_info in the 3D_service_location_descriptor described in the virtual channel entry, and instructs a reception processing unit corresponding to the other transmission path to receive the additional-view video images. The control unit 1317 also instructs the AV decoding unit 1314 to use the decoding processing unit 1352 (in the cases of the forms "service compatible: common use type 2" to "service compatible: common use type 5") or the decoding processing unit 1353 (in the cases of the forms "service compatible: independent 3D type 2" to "service compatible: independent 3D type 5") to decode the additional-view video images. Specification of the other transmission path mentioned above is described more specifically.

When the value of the 3D_service_type indicates the forms "service compatible: common use type 2" and "service compatible: independent 3D type 2" (the value of the ES_location is "000"), a URL of a source of the additional-view video images acquired via the Internet is described in the ES_location_info. The control unit 1317 thus instructs the reception processing unit 1313 to acquire a TS relating to the additional-view video images from a communication destination specified by the URL. The reception processing unit 1313 acquires the TS relating to the additional-view video images from the communication destination specified by the URL.

When the value of the 3D_service_type indicates the forms "service compatible: common use type 3" and "service compatible: independent 3D type 3" (the value of the ES_location is "001"), information for receiving mobile/handheld broadcasting, such as information indicating a modulation mode, a carrier frequency, and a channel number, is described in the ES_location_info. The control unit 1317 thus instructs the reception processing unit 1312 to receive mobile/handheld broadcasting based on the information indicating the reception frequency and the channel number, and acquire a TS relating to the additional-view video images. In accordance with the instruction, the reception processing unit 1312 receives the mobile/handheld broadcasting, and acquires the TS relating to the additional-view video images.

When the value of the 3D_service_type indicates the forms "service compatible: common use type 4" and "service compatible: independent 3D type 4" (the value of the ES_location is "010"), identification information for identifying a storage medium is described in the ES_location_info. In this case, the TS relating to the additional-view video images has already been stored in the USB memory 121 indentified by the identification information. The control unit 1317 thus instructs the reading unit 1318 to read the TS relating to 3D video images from the USB memory 121 identified by the identification information. The reading unit 1318 reads the TS relating to the 3D video images from the USB memory 121 and outputs the read TS to the AV decoding unit 1314.

When the value of the 3D_service_type indicates the forms "service compatible: common use type 4" and "service compatible: independent 3D type 4", the video transmission device 110 stores additional-view video images in a storage medium (e.g. the USB memory 121) identified by the identification information described in the ES_location_info, and the storage medium is carried and attached to the video playback device 120 manually. The video playback device 120 reads the additional-view video images from the storage medium. The additional-view video images are thereby transferred from the video transmission device 110 to the video playback device 120 via the storage medium.

When the value of the 3D_service_type indicates the forms "service compatible: common use type 5" and "service compatible: independent 3D type 5" (the value of the ES_location is "011"), information for receiving another stream, such as information indicating a modulation mode, a carrier frequency, and a channel TSID, is described in the ES_location_info. The control unit 1317 thus instructs the reception processing unit 1311 to receive broadcast waves for transmitting a TS identified by the TSID based on the information indicating the modulation mode, the carrier frequency, and the channel TSID. In accordance with the instruction, the reception processing unit 1311 receives the broadcast waves, and acquires the TS relating to the additional-view video images. The reception processing unit 1311 can simultaneously receive a plurality of physical channels. Thus, even when a TS relating to base-view video images and a TS relating to additional-view video images are transmitted through different physical channels, the reception processing unit 1311 can receive the TSs relating to both of these video images in parallel.

When the value of the 3D_service_type does not indicate any of the forms "service compatible: common use type 2" to "service compatible: common use type 5" and "service compatible: independent 3D type 2" to "service compatible: independent 3D type 5" (NO in step S1704), the control unit 1317 performs control so that 3D video images are received through the main transmission path (step S1711).

Specifically, in step S1711, when the value of the 3D_service_type indicates the form "frame compatible", the control unit 1317 instructs the reception processing unit 1311 to receive terrestrial digital broadcast waves, similarly to a case of receiving legacy 2D video images. The control unit 1317 also instructs the AV decoding unit 1314 to use the decoding processing unit 1351 to decode 3D video images.

When the value of the 3D_service_type indicates the form "service compatible: common use type 1", the control unit 1317 instructs the reception processing unit 1311 to receive terrestrial digital broadcast waves to acquire 3D video images. The reception processing unit 1311 receives and demodulates the terrestrial digital broadcast waves to extract a TS, and outputs the extracted TS to the AV decoding unit 1314. The control unit 1317 instructs the AV decoding unit 1314 to use the decoding processing unit 1351 to decode base-view video images and to use the decoding processing unit 1352 to decode additional-view video images.

When the value of the 3D_service_type indicates the form "service compatible: independent 3D type 1", the control unit 1317 instructs the reception processing unit 1311 to receive terrestrial digital broadcast waves to acquire 3D video images. The control unit 1317 also instructs the AV decoding unit 1314 to use the decoding processing unit 1353 to decode the 3D video images.

When the value of the 3D_service_type indicates the form "frame incompatible", the control unit 1317 instructs the reception processing unit 1311 to receive terrestrial digital broadcast waves for transmitting base-view video images and additional-view video images. The control unit 1317 also instructs the AV decoding unit 1314 to use the decoding processing unit 1351 to decode 3D video images.

As described above, when the value of the 3D_service_type indicates the forms "frame compatible", "service compatible: common use type 1", "service compatible: independent 3D type 1", and "frame incompatible", the reception processing unit 1311 receives and demodulates terrestrial digital broadcast waves to extract the TS and outputs the extracted TS to the AV decoding unit 1314 in accordance with the instruction from the control unit 1317. The AV decoding unit 1314 demultiplexes the input TS by using the demultiplexing unit 1331. The demultiplexing unit 1331 extracts a video ES relating to base-view video images and a video ES relating to additional-view video images by the demultiplexing, and outputs the extracted video ESs to the video decoding unit 1332. A decoding processing unit designated by the control unit 1317 decodes the video ESs extracted by the demultiplexing, and outputs a video signal relating to 3D video images generated by the decoding to the display control unit 1333.

In step S1707, the control unit 1317 instructs the display control unit 1333 to generate a screen display signal from the input video signal, and output the generated screen display signal to the display unit 1315 (step S1707). The display unit 1315 displays 3D video images on the display screen in accordance with the screen display signal.

<3.4. Switching Processing from 3D Video Display to 2D Video Display Performed by Video Playback Device (In Case of "Service Compatible: Independent 3D")>

The following describes a switching processing from display of 3D video images to display of 2D video images performed by the video playback device 120 in the case of the "service compatible: independent 3D".

Figure 18:
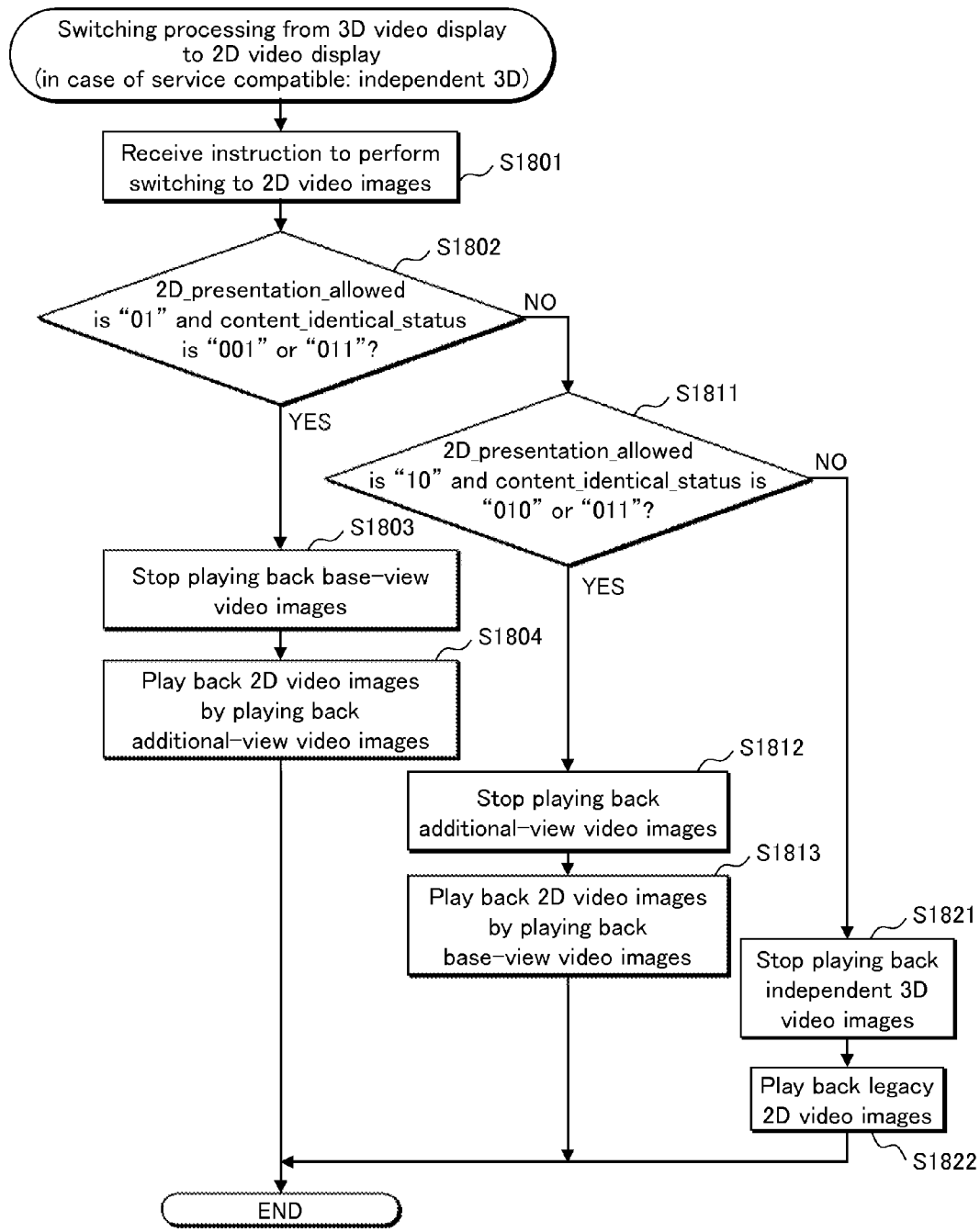
FIG. 18 is a flow chart showing a switching processing from display of 3D video images to display of 2D video images.

FIG. 18 is a flow chart showing the switching processing from the display of 3D video images to the display of 2D video images.

The control unit 1317 included in the video playback device 120 receives an instruction to perform switching to 2D video images input from a user via the input unit 1316 (step S1801).

Upon receiving the instruction to perform switching to the 2D video images, the control unit 1317 extracts the 2D_presentation_allowed and the content_identical_status from the 2D_3D_relationship_descriptor included in the EIT for 3D relating to a 3D program being displayed.

The control unit 1317 then determines whether or not the value of the 2D_presentation_allowed is "01", and the value of the content_identical_status is "001" or "011" (step S1802).

When a result of the determination in step S1802 is affirmative (YES in step S1802), the control unit 1317 instructs the AV decoding unit 1314 to stop playing back base-view video images included in the 3D video images being displayed (step S1803). The control unit 1317 then instructs the AV decoding unit 1314 to play back additional-view video images included in the 3D video images being displayed, in order to play back 2D video images (S1804).

When the result of the determination in step S1802 is negative (NO in step S1802), the control unit 1317 determines whether or not the value of the 2D_presentation_allowed is "10", and the value of the content_identical_status is "010" or "011" (step S1811).

When a result of the determination in step S1811 is affirmative (YES in step S1811), the control unit 1317 instructs the AV decoding unit 1314 to stop playing back the additional-view video images included in the 3D video images being displayed (step S1812).

The control unit 1317 then instructs the AV decoding unit 1314 to play back the base-view video images included in the 3D video images being displayed, in order to play back the 2D video images (S1813).

When the result of the determination in step S1811 is negative (NO in step S1811), the control unit 1317 instructs the AV decoding unit 1314 to stop playing back the 3D video images being played back (step S1821).

The control unit 1317 instructs the reception processing unit 1311 and the AV decoding unit 1314 to acquire and display legacy 2D video images (step S1822). In accordance with the instruction, the reception processing unit 1311 and the AV decoding unit 1314 acquire and decode the legacy 2D video images, and the display unit 1315 displays the legacy 2D video images.

<3.5. Switching Processing from 2D Video Display to 3D Video Display Performed by Video Playback Device (In Case of "Service Compatible: Common use")>

The following describes a switching processing from display of legacy 2D video images to display of 3D video images.

Figure 19:
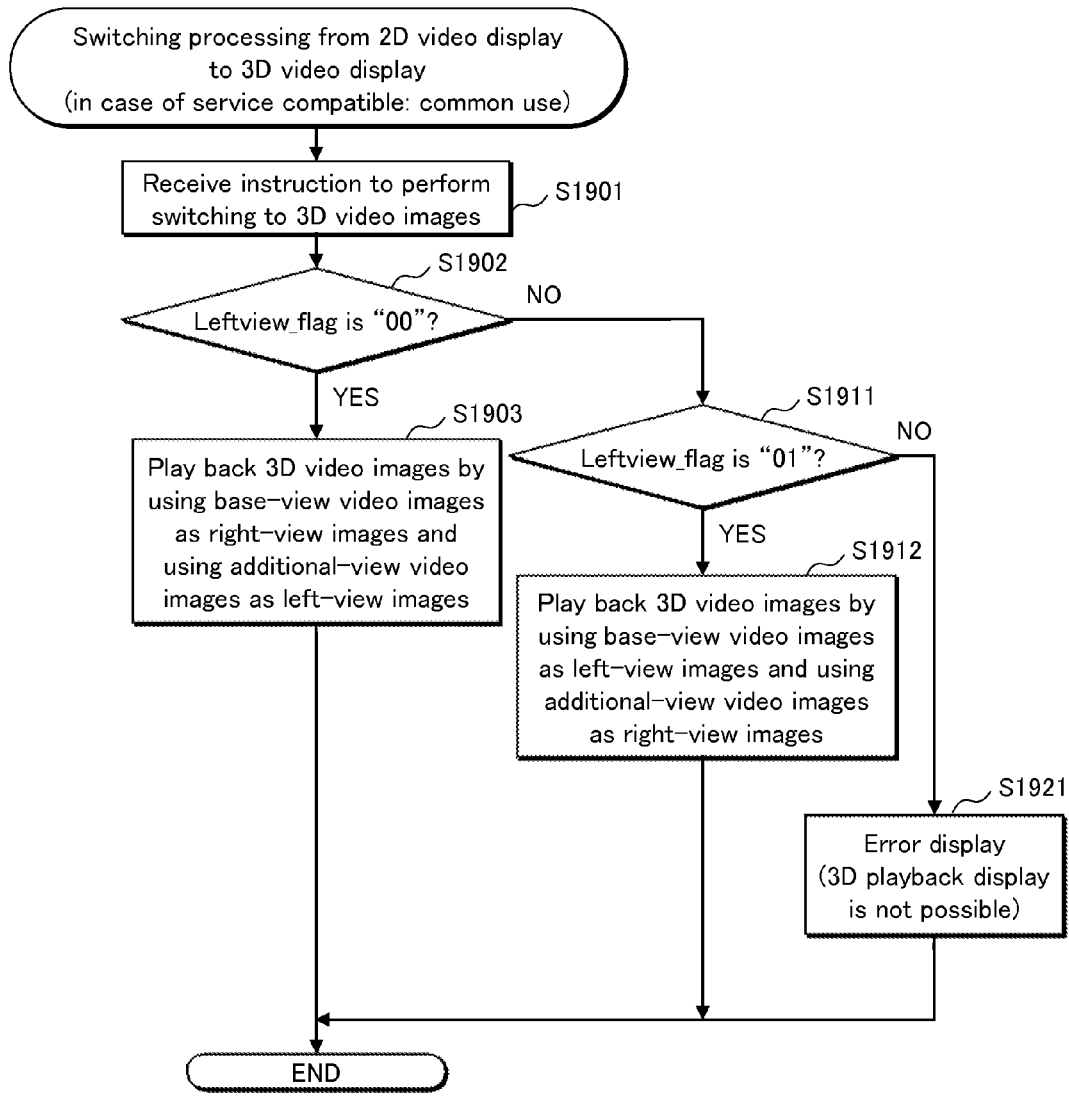
FIG. 19 is a flow chart showing a switching processing from the display of 2D video images to the display of 3D video images.

FIG. 19 is a flow chart showing the switching processing from display of 2D video images to display of 3D video images.

The control unit 1317 included in the video playback device 120 receives an instruction to perform switching to 3D video images input from a user via the input unit 1316 (step S1901).

Upon receiving the instruction to perform switching to the 3D video images, the control unit 1317 extracts the leftview_flag from the 2D_3D_relationship_descriptor included in the EIT relating to a 2D program being displayed, and determines whether or not the value of the leftview_flag is "00" (step S1902).

When the result of the determination in step S1902 is affirmative, (YES in step S1902), the control unit 1317 instructs the reception processing units, the AV decoding unit 1314, and the display unit 1315 to play back 3D video images by using base-view video images (legacy 2D video images) as right-view images and using additional-view video images as left-view images (step S1903).

The video playback device 120 plays back the 3D video images by using the base-view video images (the legacy 2D video images) as the right-view images and using the additional-view video images as the left-view images.

When the result of the determination in step S1902 is negative (NO in step S1902), the control unit 1317 determines whether or not the value of the leftview_flag is "01" (step S1911).

When the result of the determination in step S1911 is affirmative, (YES in step S1911), the control unit 1317 instructs the reception processing units, the AV decoding unit 1314, and the display unit 1315 to play back 3D video images by using the base-view video images (the legacy 2D video images) as left-view images and using the additional-view video images as the right-view images (step S1912). The video playback device 120 plays back the 3D video images by using the base-view video images (the legacy 2D video images) as the left-view images and using the additional-view video images as the right-view images.

When the result of the determination in step S1911 is negative (NO in step S1911), the control unit 1317 creates a display image (hereinafter, referred to as an "error display image") showing that 3D video images cannot be played back, and outputs a video signal representing the error display image to the display control unit 1333. The display control unit 1333 overlays the error display image with the legacy 2D video image to generate an overlaid image, and outputs a signal representing the overlaid image to the display unit 1315.

The display unit 1315 displays the overlaid image.

<4. Modifications>

The video transmission/reception system including the video transmission device and the video playback device pertaining to the present invention has been described thus far. The present invention, however, is in no way limited to the video transmission/reception system as described in the above-mentioned embodiment, and the exemplified video transmission/reception system may be modified as described below.

(1) Although a specific data structure of the ES_location_info has not been described in the above-mentioned embodiment, the ES_location_info may have a data structure as shown in FIG. 20, by way of example.

As shown in FIG. 20, in the ES_location_info, a TSID_ref indicating a TSID relating to the other stream and the source_id_ref for identifying a virtual channel for transmitting the other stream are described as details of the other transmission path used when the value of the ES_location is "011". A URL is also described as a detail of the other transmission path used when the value of the ES_location is "000". Identification information for identifying a storage medium is also described as a detail of the other transmission path used when the value of the ES_location is "010". One example of the identification information is a manufacturer's serial number unique to each USB memory.

When the value of the ES_location is "001", information for receiving the mobile/handheld broadcasting, such as information indicating a receive frequency and a channel number, is described in the ES_location_info, although such information is not shown in FIG. 20.

A WithinSamePhysicalChannel is described in the ES_location_info shown in FIG. 20, although it is not an element showing details of the other transmission path.

A table 2001 of FIG. 20 shows a list of values that the WithinSamePhysicalChannel can take and details thereof.

As shown in the table 2001, the WithinSamePhysicalChannel indicates whether the physical channel serving as the other transmission path is the same as the physical channel for transmitting the legacy 2D video image (a value "00") or not (a value "01").

When video images transmitted through the other transmission path are transmitted through the same physical channel as the legacy 2D video images, the video playback device 120 can receive the video images by using a tuner that is the same as a tuner for receiving the legacy 2D video images. On the other hand, when the video images are transmitted through a different physical channel from the legacy 2D video images, a tuner that is different from the tuner for receiving the legacy 2D video image is necessary. The video playback device 120 can determine whether the 3D video images can be received or not based on its own reception capability (e.g. whether the video playback device 120 includes a plurality of tuners or not), with reference to this element. For example, when the video playback device 120 includes a single tuner, the video playback device 120 can perform alternative operation for example by playing back 2D video images relating to a 2D program linked to a 3D program relating to the 3D video images upon recognizing that two tuners are required to play back the 3D video images with reference to this element.

(2) In the above-mentioned embodiment, the 2D_3D_channel_linkage_descriptor has been defined as the information for specifying a linkage destination program, and described in the linkage source EIT. The 2D_3D_channel_linkage_descriptor having this structure can adapt to a case where whether there is a linkage destination program or not varies among programs.

However, when whether there is a linkage destination program or not does not vary among programs, and one virtual channel is linked to the other virtual channel at all times, the 2D_3D_channel_linkage_descriptor may be used as information for specifying a linkage destination virtual channel. Specifically, in a linkage source virtual channel entry in the VCT, the 2D_3D_channel_linkage_descriptor is described.

In this case, the event_id_ref, which has been described in the 2D_3D_channel_linkage_descriptor in the above-mentioned embodiment and indicates the event_id for specifying a program, is not required to be described.

As with the 2D_3D_channel_linkage_descriptor, when a value of each element of the 2D_3D_relationship_descriptor does not vary among programs and it suffices that the value is specified for each virtual channel, the 2D_3D_relationship_descriptor may be described not in the EIT but in the virtual channel entry in the VCT.

Each element of the 2D_3D_relationship_descriptor may not necessarily be described in the 2D_3D_relationship_descriptor, and may be described in other tables and descriptors.

For example, the content_identical_status in the 2D_3D_relationship_descriptor may be described in the 2D_3D_channel_linkage_descriptor.

(3) In the above-mentioned embodiment, when the other transmission path is a storage medium, the video transmission device 110 writes the additional-view video images into USB memory, and the USB memory is carried and connected to the video playback device 120. As a result, the additional-view video images are transmitted from the video transmission device 110 to the video playback device 120 prior to reception of the base-view video images. It suffices, however, that the video playback device 120 can read the additional-view video images from the storage medium before receiving the base-view video images.

For example, predetermined USB memory may be connected in advance to the video playback device 120, the video transmission device 110 may transmit the additional-view video images to the video playback device 120 via a network and the like before transmitting the legacy 2D video images, and the video playback device 120 may record the received additional-view video images on the USB memory.

(4) In the above-mentioned embodiment, the EIT for 2D and the EIT for 3D are linked to each other by using the 2D_3D_channel_linkage_descriptor. The EIT for 2D and the EIT for 3D, however, may be linked to each other in another way.

A particular rule for linking one EIT to another EIT may be set in determining the value of the event_id, which is information for identifying the EIT.

One example of the particular rule is a rule that defining the most significant bit 13 of the event_id, which consists of 14 bits, as a bit for indicating whether its own EIT is the EIT for 2D (a value "0") or the EIT for 3D (a value "1"). Furthermore, bit 12 is defined as a bit for indicating whether there is a linked EIT (a value "1") or not (a value "0"). EITs linked to each other are assumed to have the same values of bit 11 to bit 0 of the event_id.

Figure 21:
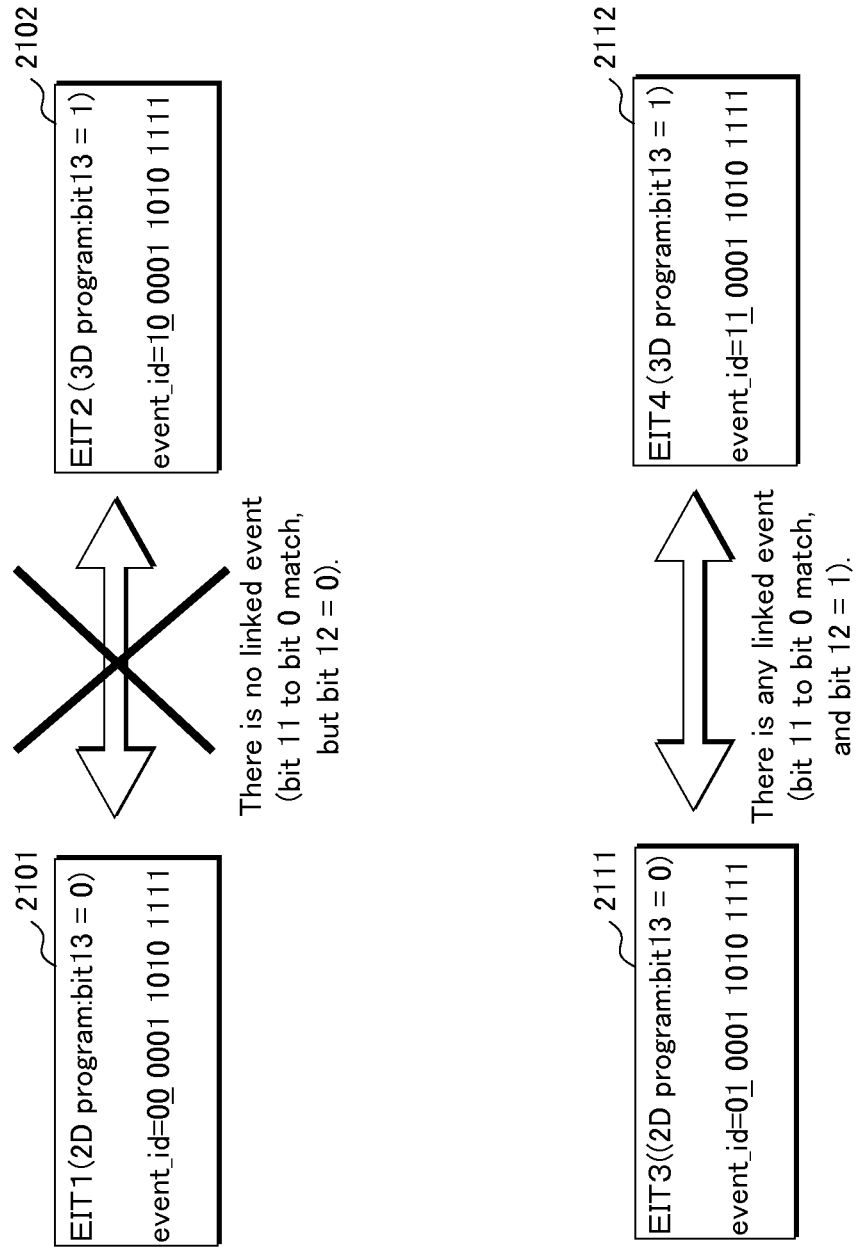
FIG. 21 shows one example of how to determine a value of an event_id in the EIT, pertaining to one modification of the present invention.

In an example of an EIT1 2101 and an EIT2 2102 shown in FIG. 21, although these EITs have the same values of bit 11 to bit 0, but values of bit 12 of these EITs are each "0". Thus, it is determined that the EIT1 2101 and the EIT2 2102 are not linked to each other.

On the other hand, in an example of a EIT3 for 2D 2111, whose value of bit 13 is "0", and a EIT4 for 3D 2112, whose value of bit 13 is "1", values of bit 12 of these EITs are each "1" and these EITs have the same values of bit 11 to bit 0. Thus, it is determined that the EIT3 2111 and the EIT4 2112 are linked to each other.

In the above-mentioned manner, the EIT for 2D and the EIT for 3D can be linked to each other without using the 2D_3D channnel linkage_descriptor.

In bit 3 to bit 0, a cyclic redundancy check (CRC) for bit 13 to bit 4 may be described. With this structure, an error regarding the event_id occurring due to a transmission line noise can be detected.

(5) In the above-mentioned embodiment, a 2D program and a 3D program are linked to each other by linking the EIT for 2D and the EIT for 3D to each other. However, a 2D virtual channel and a 3D virtual channel rather than programs can be linked to each other at all times. In order to adapt to this case, as shown in FIG. 22, a 2D_3D linkage info for defining whether there is a linkage or not may be added as an element of each of virtual channel entries relating to a 2D virtual channel and a 3D virtual channel, for example.

FIG. 22 shows a list of values that the 2D_3D linkage info can take and details thereof. The 2D_3D linkage info is a 2-bit binary value. As shown in FIG. 22, a value of the 2D_3D linkage info "00" indicates that a 2D virtual channel and a 3D virtual channel are not linked to each other, and an EIT for 2D and an EIT for 3D are not linked to each other.

A value of the 2D_3D linkage info "01" indicates that a 2D virtual channel and a 3D virtual channel are linked to each other.

A value of the 2D_3D linkage info "02" indicates that an EIT for 2D and an EIT for 3D are linked to each other.

The linkage is not limited to the linkage between the EIT for 2D and the EIT for 3D, and the linkage between the 2D virtual channel and the 3D virtual channel.

For example, instead of a linkage between 2D and 3D, an EIT relating to a video image having a resolution of 2K1K and an EIT relating to a video image having a resolution of 4K2K may be linked to each other. Similarly, a virtual channel for transmitting a program relating to a video image having a resolution of 2K1K and a virtual channel for transmitting a program relating to a video image having a resolution of 4K2K may be linked to each other. Furthermore, EITs relating to video images captured from different angles may be linked to each other, and virtual channels for transmitting programs relating to video images captured from different angles may be linked to each other.

(6) In the above-mentioned embodiment, as shown in the electronic program guide 1602 of FIG. 16, the column relating to the 2D virtual channel including the linkage source EIT and the column relating to the 3D virtual channel including the linkage destination EIT are arranged side by side in the electronic program guide, in order to indicate that there are programs and virtual channels linked to each other. It suffices, however, that the electronic program guide has a structure with which a user can recognize that there are programs and virtual channels linked to each other.

(A) For example, a pop-up image may be used.

Figure 23:
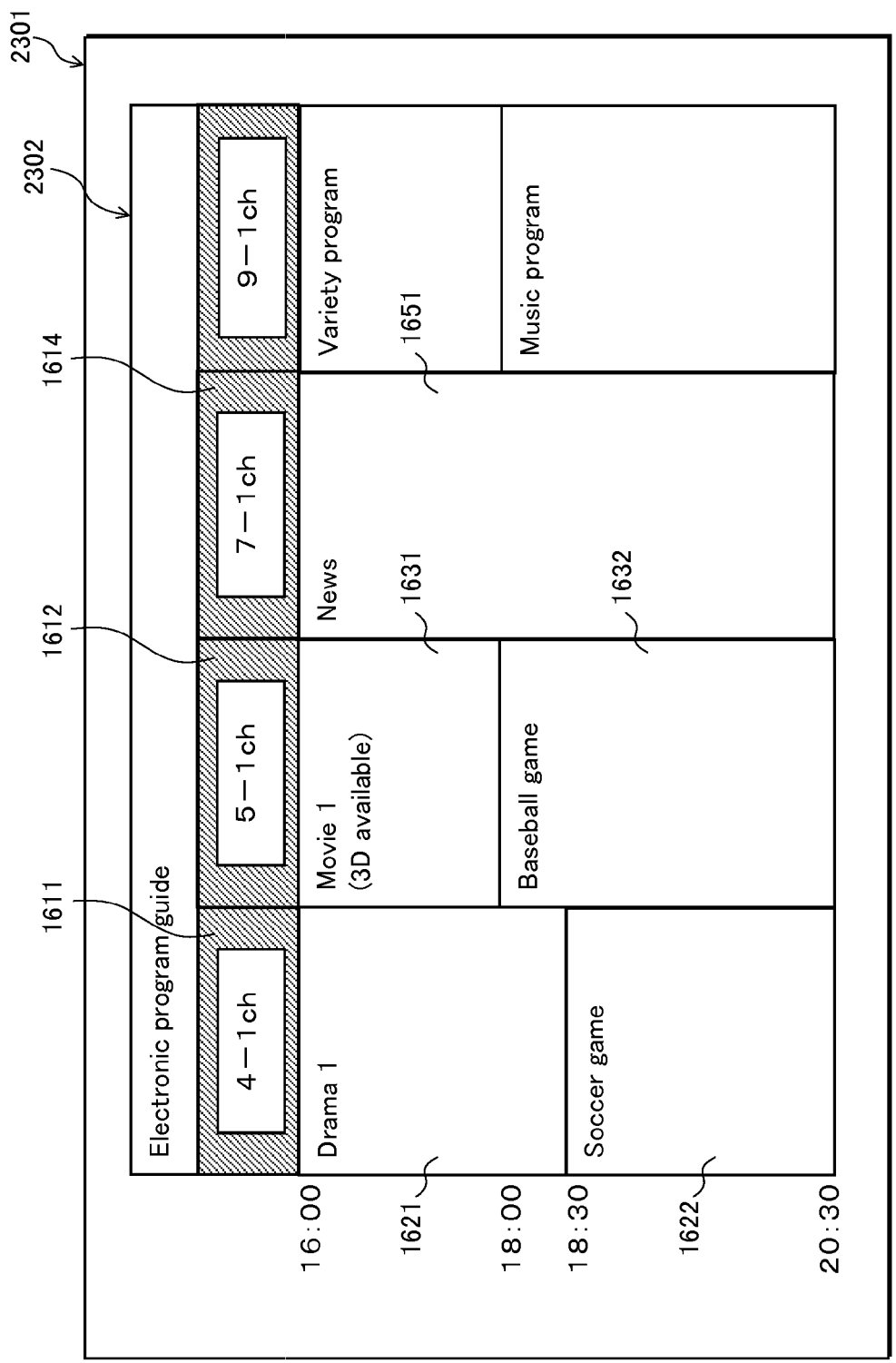
FIG. 23 shows one example of an electronic program guide pertaining to yet another modification of the present invention.

In the present modification, when there are a 2D virtual channel (e.g. a 2D virtual channel having a virtual channel number "5-1ch") and a 3D virtual channel (e.g. a 3D virtual channel having a virtual channel number "15-3ch") linked to each other as shown in FIG. 16, a column relating to only one of the virtual channels (e.g. the 2D virtual channel relating to the linkage source EIT) is displayed in the electronic program guide 2301 as shown in FIG. 23. In the image 1631 displaying information relating to a program indicated by the linkage source EIT, an indication (e.g. characters "3D available" in the image 1631) for allowing a user to recognize the existence of a program relating to the linkage destination EIT is included.

Figure 24:
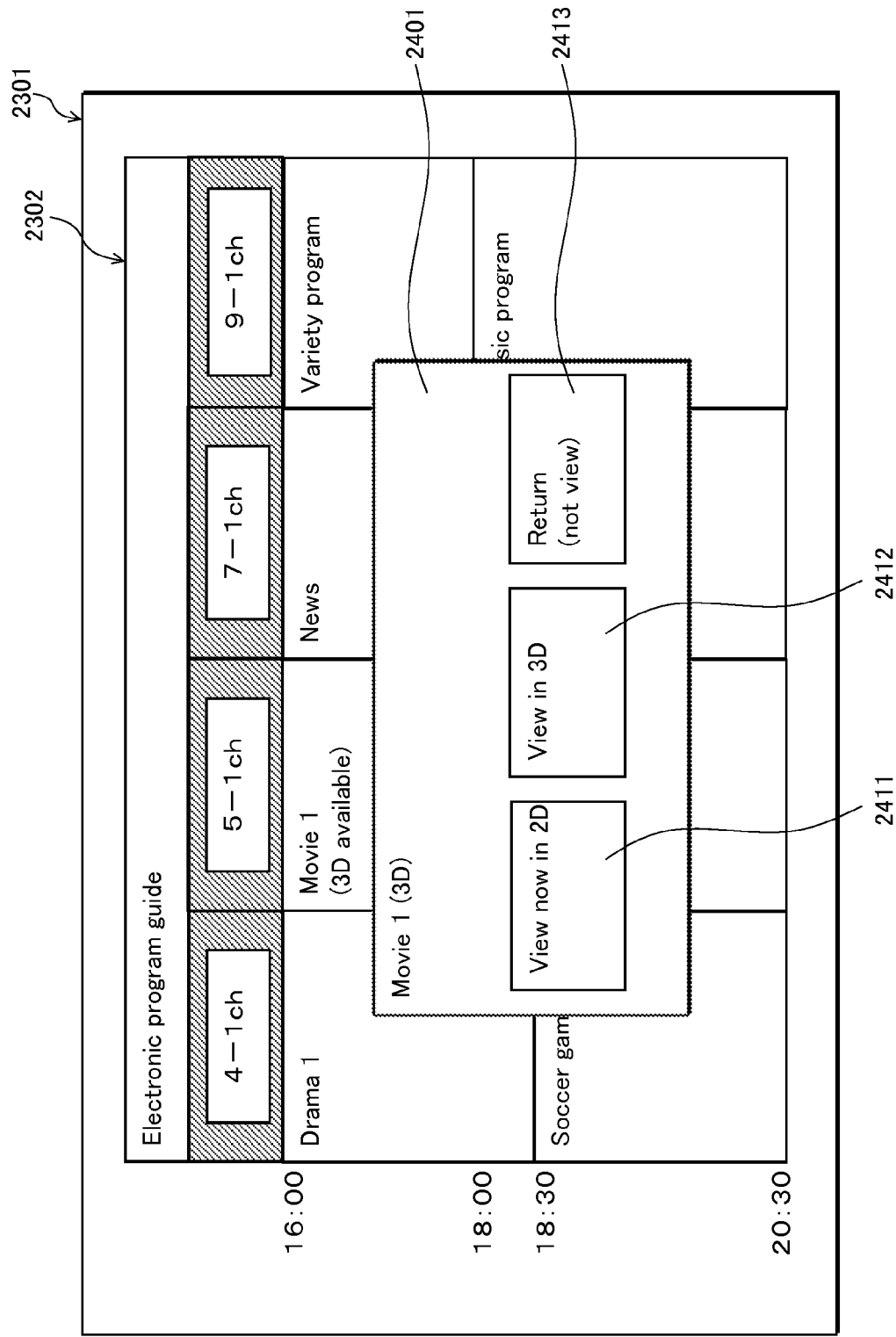
FIG. 24 shows one example of an electronic program guide displaying a pop-up image, pertaining to yet another modification of the present invention.

When a user selects, from the electronic program guide 2301, the image 1631 as a program that the user wants to view, a pop-up image 2401 is displayed on the electronic program guide 2301 as shown in FIG. 24.

The pop-up image 2401 includes buttons for selecting one of the following options: viewing the selected program in 2D (a button 2411); viewing the program in 3D (a button 2412); and not viewing the program (a button 2413). When one of the buttons 2411 to 2413 is selected, the video playback device 120 performs a processing corresponding to the selected button, such as a processing to play back video images.

With this structure, occupancy of an area of the electronic program guide 1602 corresponding to the two columns relating to the virtual channels are avoided when a 2D program and a 3D program linked to each other, which are typically similar in content, are displayed, thereby leading to an effective use of a display area. In addition, selection of viewing in 2D or viewing in 3D in the electronic program guide is facilitated compared to a case where a user selects one of the columns relating to the virtual channels to be viewed.

When the device has a recording function, buttons such as buttons "record in 2D" and "record in 3D" may be displayed in addition to buttons "view now" and "view in 3D". By allowing a user to select recording in 2D or recording in 3D in a visible manner, when the button "record in 2D" is selected, only a video stream (a video stream relating to legacy 2D video images) and an audio stream necessary for display in 2D are recorded, while independent 3D video images and additional-view video images are not recorded. In the above-mentioned manner, storage capacity necessary for recording video images can be reduced compared to a case where a video stream necessary for display in 3D is additionally recorded.

Figure 25:
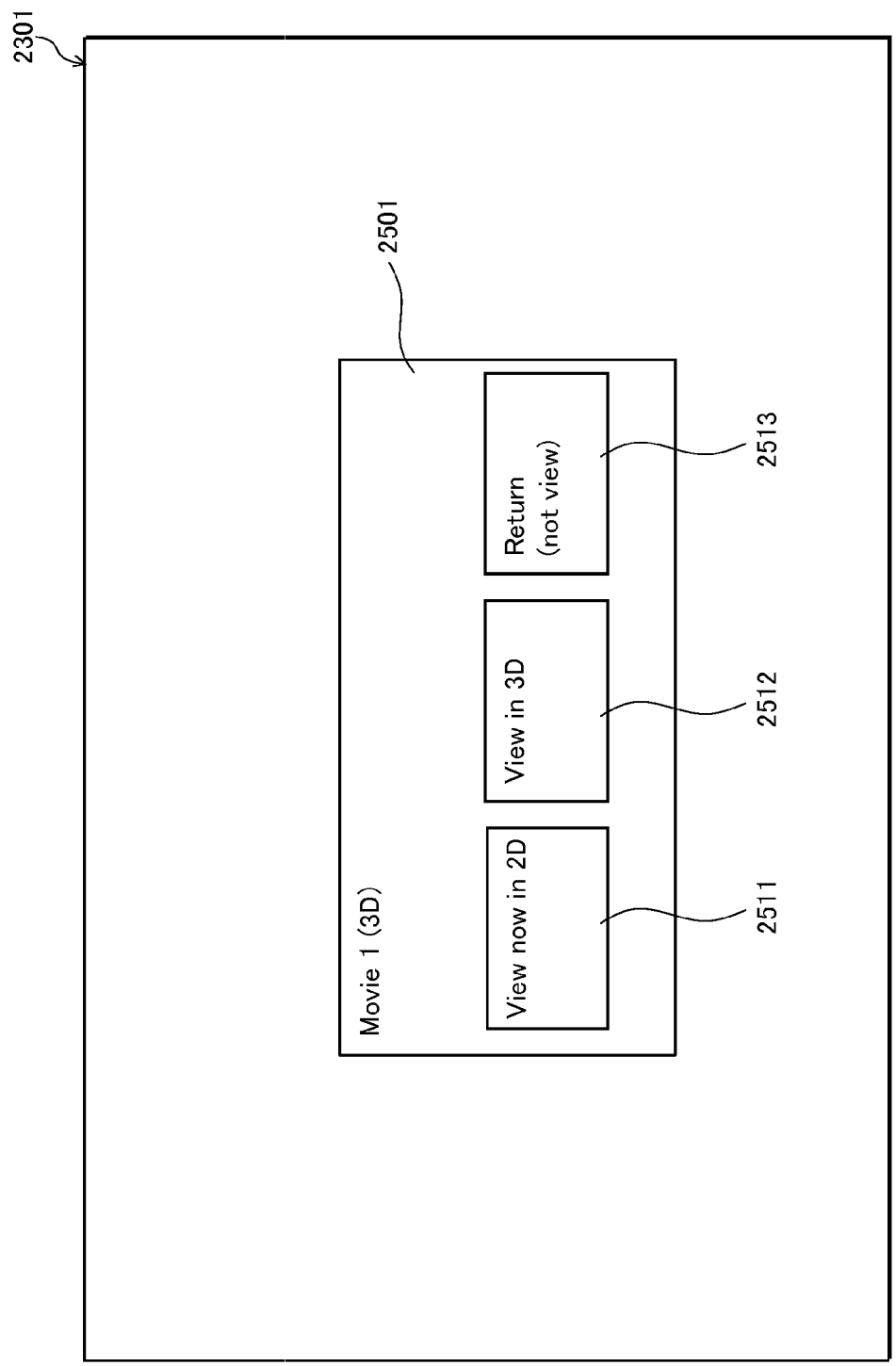
FIG. 25 shows one example of an image for receiving an instruction from a user, pertaining to yet another modification of the present invention.

Instead of displaying the pop-up image as shown in FIG. 24, display of the electronic program guide may be switched to display of an image shown in FIG. 25 that is the same as the above-mentioned pop-up image in content.

Figure 26:
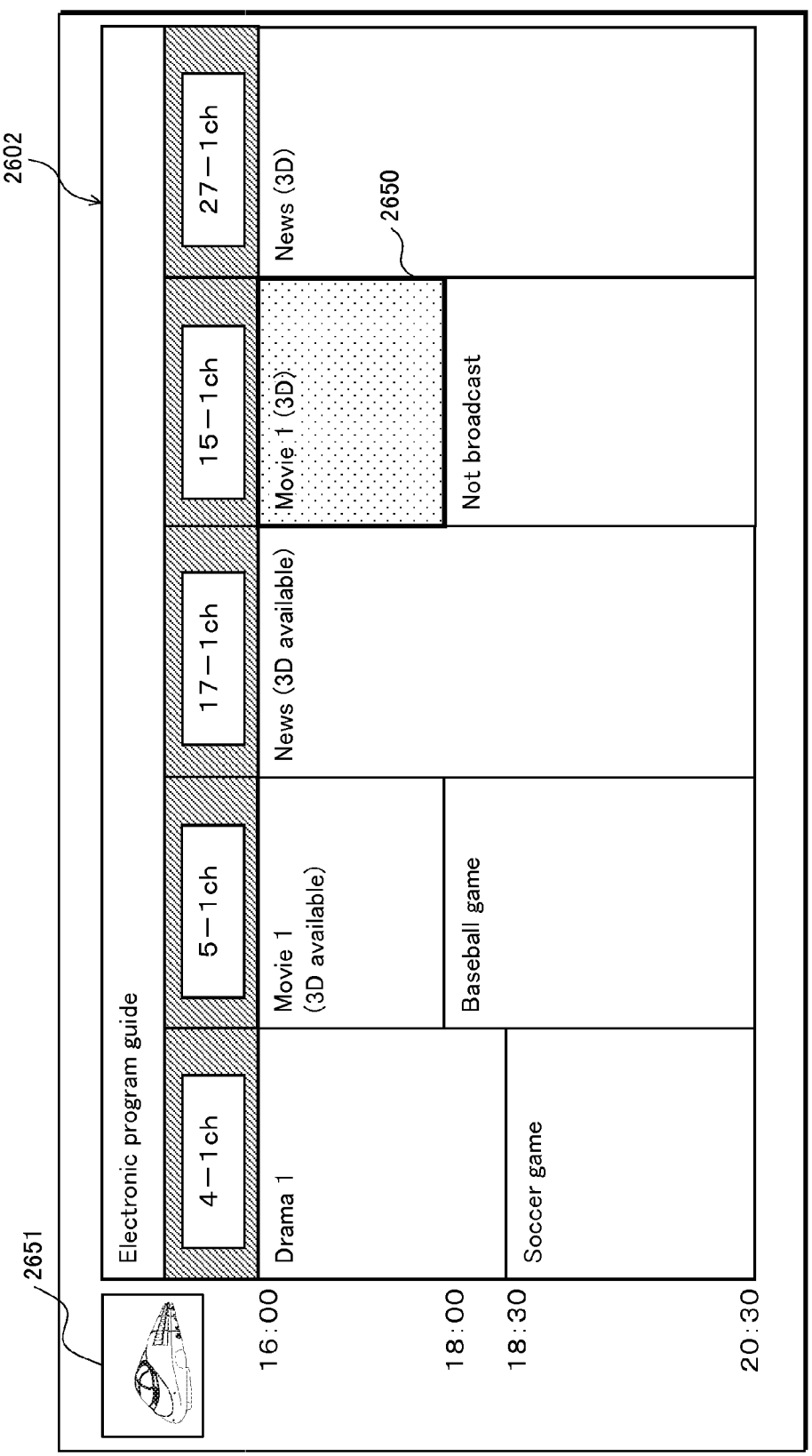
FIG. 26 shows one example of an electronic program guide displaying 2D virtual channels separately from 3D virtual channels, pertaining to yet another modification of the present invention.

(B) As shown in FIG. 26, for example, a column relating to a 2D virtual channel and a column relating a 3D virtual channel may be arranged separately in the electronic program guide.

In an electronic program guide 2602 shown in FIG. 26 pertaining to the present modification, columns relating to 3D virtual channels (15-1ch and 27-1ch in FIG. 26) are arranged after columns relating to 2D virtual channels (4-1ch, 5-1ch, and 17-1ch in FIG. 26). A thumbnail video image 2651 relating to a program ("movie 1 (3D)" in FIG. 26) selected by a cursor 2650 is displayed in the electronic program guide 2602. When a program selected by the cursor 2650 switches between a 2D program and a 3D program, a video image displayed as the thumbnail video image also switches between a 2D video image and a 3D video image.

In this case, if a column relating to a 2D virtual channel and a column relating to a 3D virtual channel are mixed in the electronic program guide, a user can feel uncomfortable as the thumbnail video image frequently switches between a 2D video image and a 3D video image upon movement of the cursor 2650. According to the present modification, such an uncomfortable feeling of the user can be reduced.

The processing to switch between a 3D video image and a 2D video image places a higher processing load on the video playback device 120 than the other processing such as switching between decoding processing units to be used. According to the present modification, the frequency of switching between a 2D video image and a 3D video image is reduced, thereby reducing a processing load placed on the video playback device 120.

In this case, it is desirable to determine in advance a range of virtual channel numbers assigned to 2D virtual channels and a range of virtual channel numbers assigned to 3D virtual channels at a transmitting end. This is because a receiving end typically arranges columns relating to virtual channels in ascending order based on virtual channel numbers assigned thereto in the electronic program guide.

(7) In the above-mentioned embodiment, a legacy playback device typified by the video playback device 130 cannot recognizes, when a 2D program and a 3D program linked to each other are transmitted from the video transmission device 110 in accordance with the extended ATSC standard, that the 3D program is transmitted. However, if the legacy playback device can notify a user that, although playback of the 3D program itself is not possible, the linked 3D program is broadcast, an advertising effect of, for example, informing the user that the 3D program is broadcast and promoting upgrading to a video playback device capable of playing back a 3D video image can be produced.

In the present modification, PSIP information is transmitted so that the legacy playback device can receive and present information (e.g. a program title) relating to the linked 3D program in accordance with the existing ATSC standard.

Figure 27:
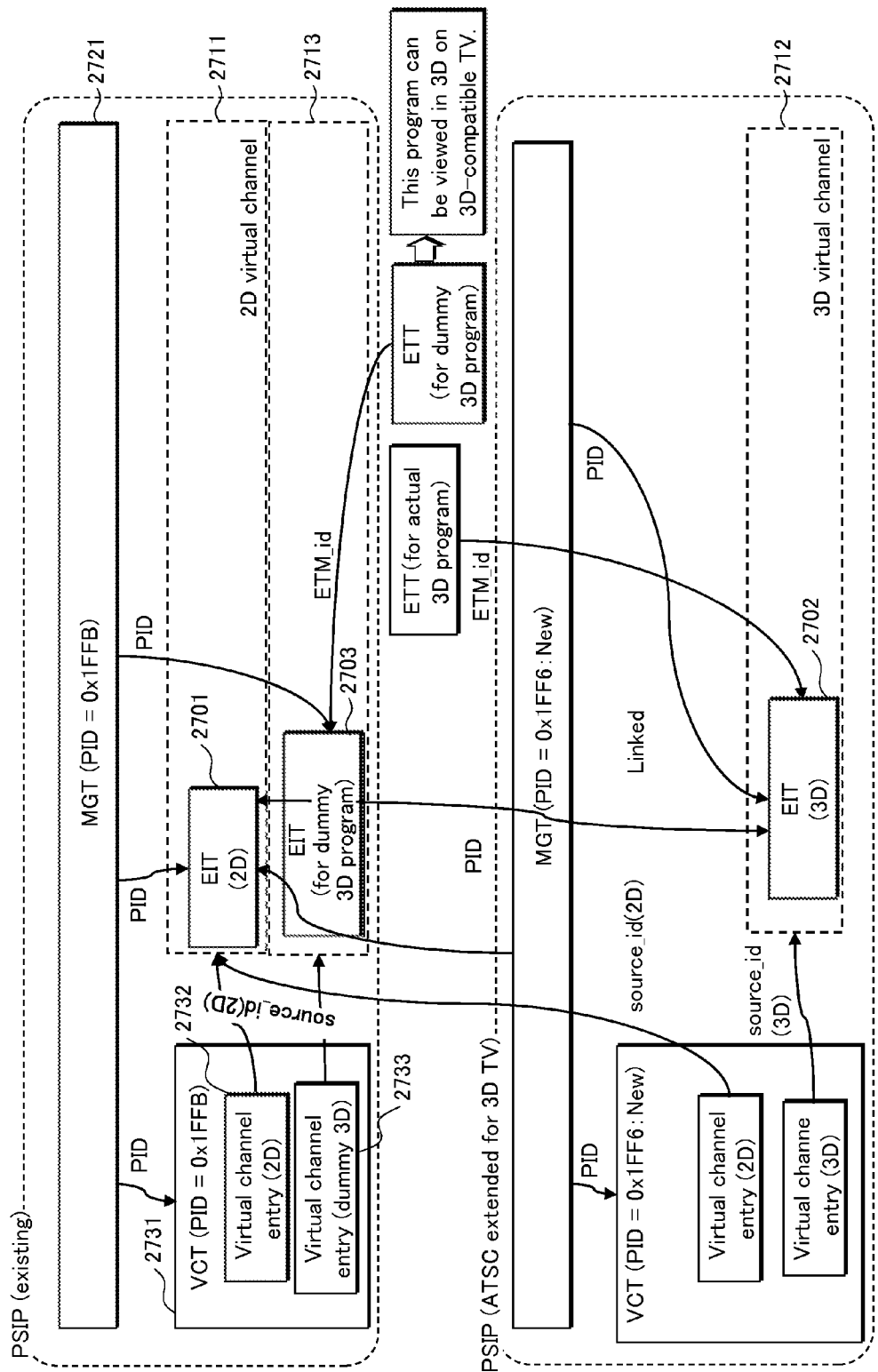
FIG. 27 shows overviews of an MGT, a VCT, and an EIT, and relationships among these tables pertaining to yet another modification of the present invention.

FIG. 27 shows overviews of the MGT, the VCT, and the EIT, and relationships among them pertaining to the present modification.

The following description is made on the assumption that an EIT 2701 relating to a given 2D program and an EIT 2702 relating to a 3D program are linked to each other. Assume that the 2D program is transmitted through a 2D virtual channel 2711, and the 3D program is transmitted through a 3D virtual channel 2712.

In an MGT 2721 (whose PID is "0x1FFB") that the legacy playback device can receive, a PID of the EIT 2701 is described. In a VCT 2731 (whose PID is "0x1FFB") that the legacy playback device can receive, a virtual channel entry (2D) 2732 defining the 2D virtual channel 2711 is described. A virtual channel entry (dummy 3D) 2733 relating to a dummy 3D virtual channel 2713 is also described in the VCT 2731. Information described in the virtual channel entry 2733 is set to be the same as information described in the virtual channel entry 2732 except for the source_id defined to have a unique value.

An EIT 2703 relating to a dummy 3D program transmitted through the dummy virtual channel 2713 is added to an EIT to be transmitted. In the EIT 2703, information relating to the 3D program described in the EIT 2702 is described as information relating to the 3D program. The source_id in the EIT 2703 has a value for specifying the virtual channel 2713 (the same value as the source_id described in the virtual channel entry 2733).

By the video transmission device 110 transmitting the PSIP information having the above-mentioned structure, a legacy playback device that has received the PSIP information can display information (i.e. information relating to the linked 3D program) described in the EIT 2703 as information relating to a program broadcast through the virtual channel 2713 in EPG.

When the dummy 3D virtual channel 2713 is selected by a user, the legacy playback device actually receives the 2D virtual channel 2711 based on the description in the virtual channel entry (dummy 3D) 2733. As a result, malfunction caused by playing back a 3D video image is avoided.

It is desirable that a program title described in an EIT relating to a 2D program and program titles described in EITs relating to the linked 3D program and a dummy 3D be determined so that a user can easily recognize that these programs are linked to one another. For example, a program title described in the EIT 2701 is "To Improve Income/expenditure Balance in Intellectual Properties (3D)", the program titles described in the EIT 2702 and the EIT 2703 should be "To Improve Income/expenditure Balance in Intellectual Properties (3D)", for example.

In the existing ATSC standard and the extended ATSC standard, the video transmission device 110 can transmit an extended text table (ETT) for presenting detailed information on each program to a user in association with a corresponding EIT. Thus, a notification to be presented to a viewer, such as a message "this program can be viewed in 3D on ATSC 3D-compatible TV", may be included as information relating to a 3D program.

Figure 28:
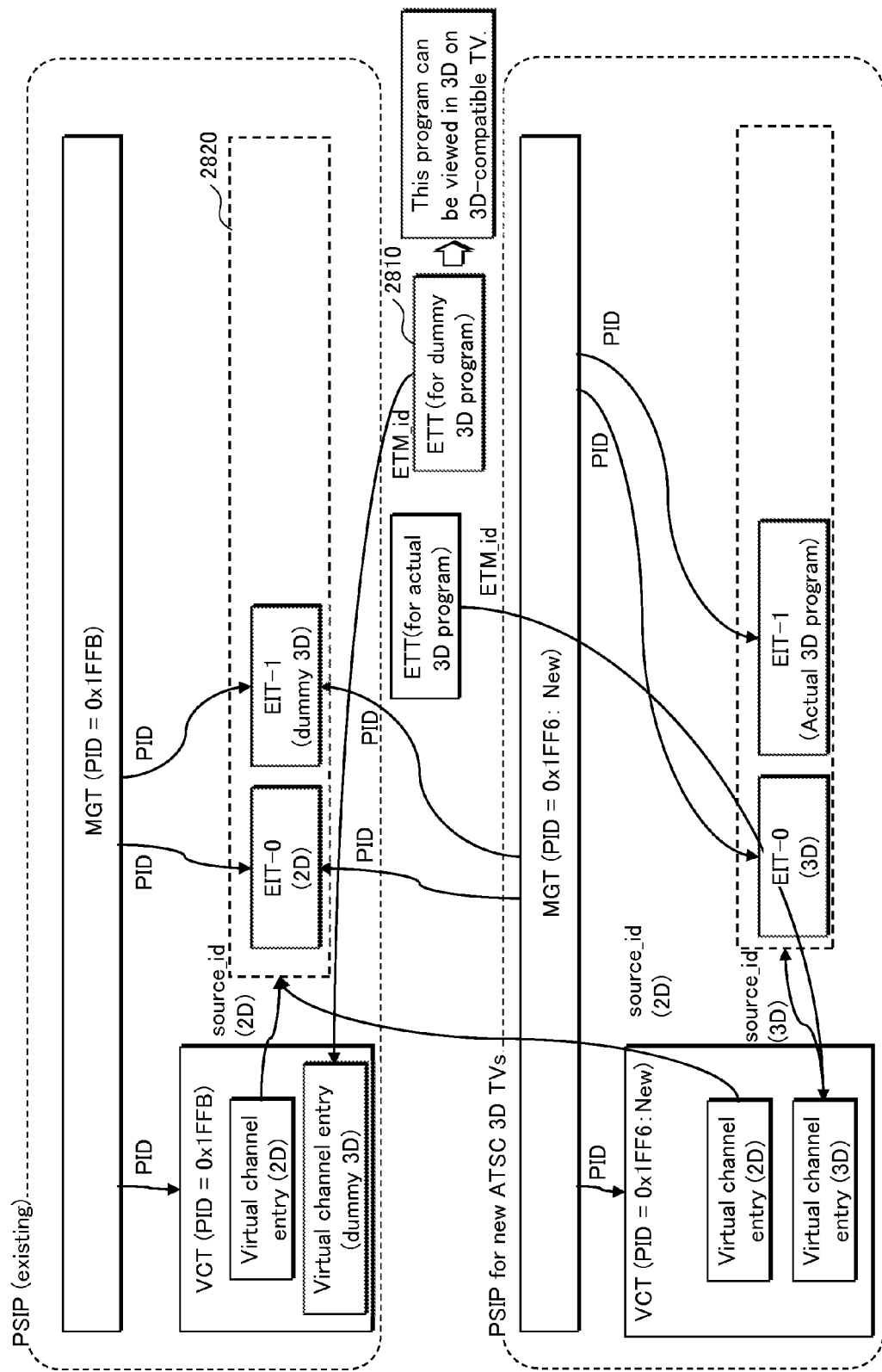
FIG. 28 shows overviews of an MGT, a VCT, and an EIT, and relationships among these tables pertaining to yet another modification of the present invention.

As shown in FIG. 28, an ETT 2810 may be transmitted not in association with the EIT but in association with a virtual channel 2820.

With this structure, the legacy playback device can present a user with existence or absence of the linkage not for each program but for each virtual channel. For example, a message "on this channel, program can be viewed in 3D on ATSC 3D-compatible TV" is described in an ETT relating to a dummy 3D virtual channel. A legacy playback device that has received the ETT displays the message described in the ETT when displaying information relating to the dummy virtual channel in the EPG. As a result, the legacy playback device can notify a user that the 3D virtual channel linked to the 2D virtual channel is transmitted.

(8) Regarding the 2D_presentation_allowed, the above-mentioned embodiment has made no reference to which one of a base-view video image and an additional-view video image constituting a 3D video image is desirable to be displayed as a 2D video image especially when the 3D video image is encoded using MPEG4 MVC. In particular, when the base-view video image is identical to the additional-view video image (in a case of a 2D video image), it is desirable to display the additional-view video image as a 2D video image.

Figure 29:
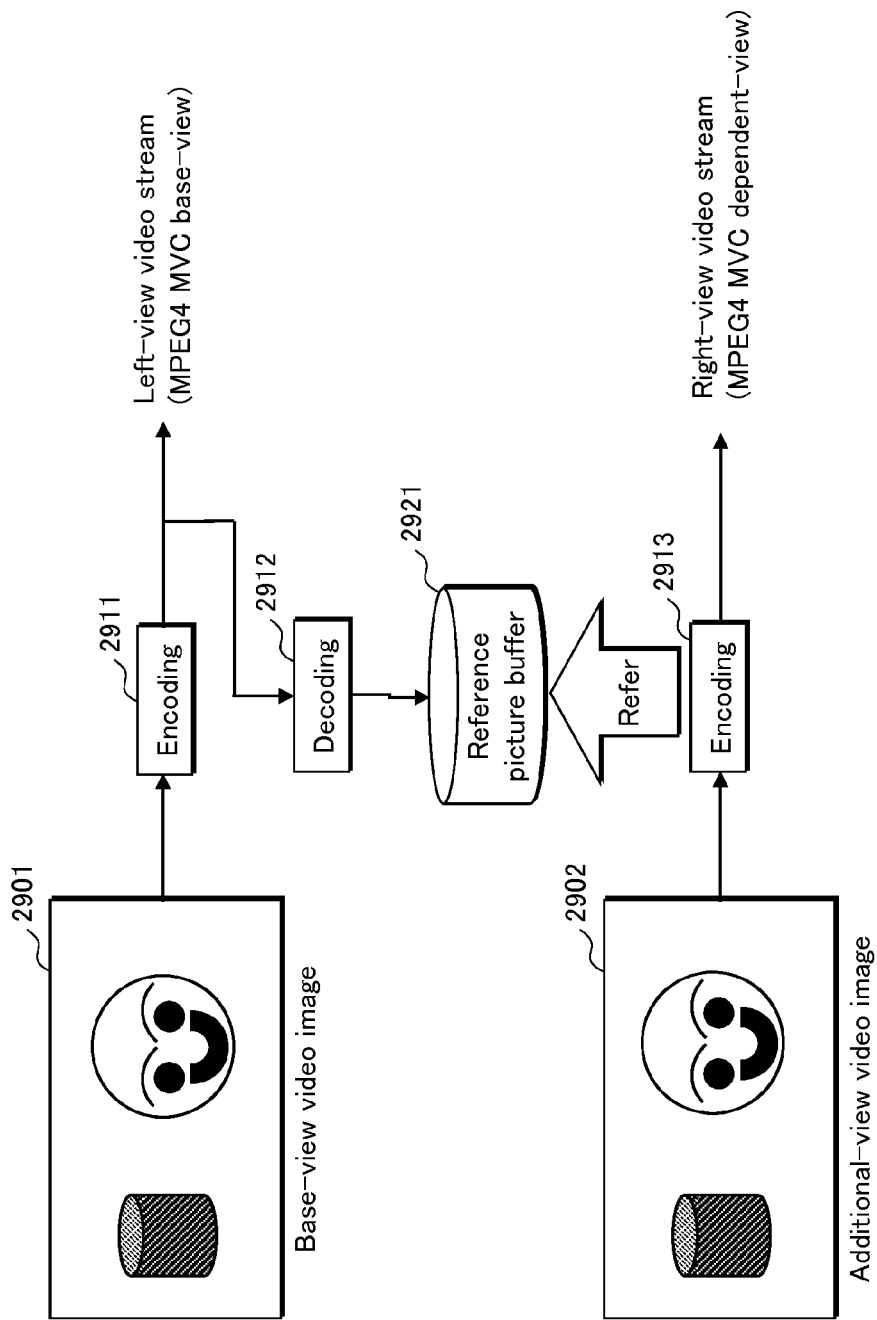
FIG. 29 schematically shows a processing to encode 3D video images using MPEG4 MVC.

FIG. 29 schematically shows a processing to encode a base-view video image 2901 and an additional-view video image 2902 using MPEG4 MVC.

The base-view video image 2901 is encoded (2911) using MPEG4 AVC without referring to another video image.

The base-view video image 2901 having been encoded (2911) is decoded (2912), and stored in a reference picture buffer 2921 as a reference video image used when the additional-view video image 2902 is encoded.

The additional-view video image 2902 is encoded with reference to the reference video image stored in the reference picture buffer 2921.

In this case, it is desirable to use the additional-view video image for 2D display from the standpoints of image quality. As shown in FIG. 29, when a left-view image and a right-view image that are identical to each other are compressed using MPEG4 MVC, an image compressed with reference to the other image is higher in image quality than the other image.

When the base-view video image and the additional-view video image are identical to each other, the additional-view video image is encoded by compression encoding a difference between the reference video image (including a noise and a distortion caused during compression) stored in the reference picture buffer and a video image (with no noise and distortion) relating to the additional-view video image. Thus, the noise and the distortion during compression included in the reference video image are mitigated, and the additional-view video image becomes higher in image quality than the base-view video image through compression encoding.

(9) In the above-mentioned embodiment, the MGT for 3D has been added to the extended PSIP information. However, it suffices to transmit information to be described in the MGT for 3D. For example, a descriptor for describing part of the description that is not included in the MGT for 2D may be defined and described in the MGT for 3D shown in FIG. 4. By configuring the MGT as described above, a legacy playback device does not identify the content of the MGT for 3D as it does not refer to the new descriptor, and only a video playback device conforming to the extended PSIP information can identify the content of the MGT for 3D.

(10) In the above-mentioned embodiment, when the value of the ES_location is "000", a URL has been described in the ES_location_info as information indicating a source of acquisition via the Internet. It suffices, however, that the source of acquisition is identified. For example, the information indicating the source of acquisition via the Internet is not limited to the URL, and may be an IP address and the like. Information necessary for acquiring the additional-view video image, such as a name of a file storing therein the additional-view video image and whether authentication is required or not to acquire the additional-view video image, may be included in the ES_location_info.

(11) In the above-mentioned embodiment, 11 examples of the provision form that the 3D_service_type can indicate have been shown. However, there is no need to use all the 11 examples of the provision form, and another provision form may be defined and described as the provision form that the 3D_service_type can indicate. For example, as the provision form that the 3D_service_type can indicate, a provision form using a 2D video image and information on a depth map may be added.

(12) In the above-mentioned embodiment, the linkage_direction has been included as an element of the 2D_3D_channel_linkage_descriptor. It suffices, however, that a case where the linkage source EIT is an EIT for 2D and the linkage destination EIT is an EIT for 3D is distinguished from a case where the linkage source EIT is an EIT for 3D and the linkage destination EIT is an EIT for 2D.

For example, in the EIT, the linkage_direction may not be included as an element of the 2D_3D_channel_linkage_descriptor, and the video playback device 120 may determine that the linkage destination EIT is an EIT for 2D when a virtual channel for transmitting the linkage destination EIT is a 2D virtual channel, and that the linkage destination EIT is an EIT for 3D when the virtual channel for transmitting the linkage destination EIT is a 3D virtual channel.

(13) In the above-mentioned embodiment and modifications, programs have been linked to each other by inserting the 2D_3D_channel_linkage_descriptor into the EIT. It suffices, however, to link programs to each other. For example, an elementary PID of the same legacy 2D video image may be registered to a program map table (PMT) relating to a 2D program and a PMT relating to a 3D program linked to the 2D program. As with the PMT, an elementary PID of the same legacy 2D video image may be registered to the Service_Location_Descriptor relating to a 2D program and the Service_Location_Descriptor relating to a 3D program. With this structure, programs are linked to each other within a scope specified in the existing ATSC standard.

(14) When a 2D virtual channel and a 3D virtual channel are linked to each other, a value of a program_number (hereinafter, referred to as a "2D_PN") described in a virtual channel entry relating to the 2D virtual channel and a value of a program_number (hereinafter, referred to as a "3D_PN") described in a virtual channel entry relating to the 3D virtual channel may be determined to show a specific relation. For example, the value of the 3D_PN and the value of the 2D_PN are determined to satisfy the relation 3D_PN=2D_PN+1.

By collating program numbers of virtual channel entries in the VCT based on the above-mentioned relation, the 2D virtual channel and the 3D virtual channel can be linked to each other.

As an example of the specific relation, the 2D virtual channel and the 3D virtual channel may be linked to each other by setting the same value to a part of the program_number consisting of 16 bits.

(15) In the above-mentioned embodiment and modifications, virtual channels have been linked to each other by inserting the 2D_3D_channel_linkage_descriptor into each virtual channel entry in the VCT. Virtual channels, however, may be linked to each other by using another method.

For example, a reserved area of the virtual channel entry, which is not used in the ATSC standard, may be used as an element (hereinafter, referred to as a "LinkStatus") indicating whether or not a virtual channel is linked to another virtual channel.

Assume that the LinkStatus is a 2-bit element.

A value "0" of a higher order bit of the LinkStatus indicates that a virtual channel indicated by its own virtual channel entry is a 2D virtual channel, and a value "1" of the higher order bit of the LinkStatus indicates that the virtual channel indicated by its own virtual channel entry is a 3D virtual channel.

A value "1" of a lower order bit of the LinkStatus indicates that a virtual channel indicated by a virtual channel entry described before or after its own virtual channel entry is a linked virtual channel. The lower order bit is set on the assumption that, when virtual channel entries are listed in the VCT, and a 2D virtual channel is linked to a 3D virtual channel, a virtual channel entry relating to the 2D virtual channel is described before a virtual channel entry relating to the linked 3D virtual channel.

That is to say, the "virtual channel entry described before or after its own virtual channel entry" refers to a "virtual channel entry described after its own virtual channel entry" when its own virtual channel entry defines a 2D virtual channel. The "virtual channel entry described before or after its own virtual channel entry" refers to a "virtual channel entry described before its own virtual channel entry" when its own virtual channel entry defines a 3D virtual channel. As described above, whether virtual channels are linked to each other or not can be indicated by using the LinkStatus without adding another descriptor.

The LinkStatus described above is a 2-bit element to further indicate whether its own virtual channel is a 2D virtual channel or a 3D virtual channel. The LinkStatus, however, may be a 1-bit element to only indicate whether virtual channels are linked to each other or not.

(16) In the above-mentioned embodiment and modifications, a 2D virtual channel and a 3D virtual channel have been linked to each other by inserting the 2D_3D_channel_linkage_descriptor into each virtual channel entry in the VCT. A 2D virtual channel and a 3D virtual channel, however, may be linked to each other by using another method.

For example, although the VCT for 3D has been added in the above-mentioned embodiment, the VCT for 3D may not be added. A 2D virtual channel and a 3D virtual channel may be linked to each other by determining that a virtual channel entry relating to the 2D virtual channel and a virtual channel entry relating to the 3D virtual channel linked to the 2D virtual channel are sequentially described when virtual channel entries are listed in the VCT.

Furthermore, virtual channel numbers may be appended to the respective 2D virtual channel and the 3D virtual channel linked to each other according to a particular rule.

For example, a virtual channel number appended to the 3D virtual channel may be determined to be a number obtained by adding a value "10" to a virtual channel number appended to the 2D virtual channel.

As a result, virtual channels linked to each other can be specified by determining whether or not there are any virtual channel numbers appended to virtual channels that follow the particular rule.

(17) In the above-mentioned embodiment, a processing to be performed by the video playback device 120 when a 2D program and a 3D program that are different in length are broadcast in parallel, and playback of one of the programs that is shorter in length is completed has not particularly described. In this case, the video transmission device 110 can instructs the video playback device 120 to perform switching between programs by transmitting a directed channel change table (DCCT) in accordance with the existing PSIP standard. In this case, a message "since a 3D program has been completed, the 3D program is switched to a corresponding 2D program", for example, may be described in a DCC Departing Request Descriptor (or a DCC Arriving Request Descriptor) in the DCCT. With this structure, the video playback device 120 can receive the DCCT, and display the message described in the DCC Departing Request Descriptor (or the DCC Arriving Request Descriptor) when performing switching between programs in accordance with the DCCT. This can prevent user's confusion from being caused by sudden switching of a program being played back or a virtual channel being selected.

In contrast to the above-mentioned case where the video playback device 120 performs switching between programs not in accordance with a user instruction, the video playback device 120 may perform switching between programs upon receiving a user instruction to perform switching.

When the video playback device 120 plays back only a 2D program and a 3D program linked to the 2D program is not transmitted from the video transmission device 110, the video playback device 120 may display a graphic user interface (GUI) to allow a user to select viewing the 3D program at the start of transmission of the 3D program.

In the above-mentioned case, the video playback device 120 has been described to perform switching between programs in accordance with the DCCT. It suffices, however, that the switching processing is performed.

For example, the video playback device 120 may determine whether or not there are the linkage destination EIT or the linkage destination virtual channel by referring to the 2D_3D_channel_linkage_descriptor as described above, and may switch between displayed programs or selected virtual channels when there are the linkage destination EIT and the linkage destination virtual channel. It is desirable that the video playback device 120 display a notification of switching between programs or virtual channels also in this case.

(18) In the above-mentioned embodiment, an independent 3D video image has been encoded using MPEG4 MVC. It suffices, however, to encode an independent 3D video image. For example, an independent 3D video image may be encoded using H.265 (ISO/IEC 23008-2 HEVC). As for video images having been described to be encoded using MPEG2 and MPEG4 AVC, it suffices to encode these video images. An encoding scheme is not limited to those shown in the above-mentioned embodiment as examples.

(19) In the above-mentioned embodiment, the 2D_3D_relationship_descriptor has been described in the EIT and then transmitted. It suffices, however, to transmit the 2D_3D_relationship_descriptor. For example, the 2D_3D_relationship_descriptor may be described in a video ES. More specifically, the 2D_3D_relationship_descriptor may be described in a user_data when the encoding scheme is MPEG2, and described in supplemental enhancement information (SEI) when the encoding scheme is MPEG4 AVC and MPEG4 MVC.

With this structure, the video transmission device 110 can designate the content of the 2D_3D_relationship_descriptor for each frame or for each GOP, and transmit the 2D_3D_relationship_descriptor to the video playback device 120.

Although the content_identical_status has been described in the 2D_3D_relationship_descriptor in the EIT in the above-mentioned embodiment, the content_identical_status may be described in a video ES as with the 2D_3D_relationship_descriptor.

(20) In the above-mentioned embodiment, in the form "frame incompatible", each encoded video image has been described to be transmitted through terrestrial digital broadcast waves. One of images constituting the video image, however, may be transmitted through the other transmission path. In this case, as a value that the 3D_service_type can take, a value corresponding to each of other transmission paths may be defined and added.

(21) In the above-mentioned embodiment, the Internet, the mobile/handheld broadcasting, the storage medium, and the other stream (broadcasting) have been taken as the examples of the other transmission path. It suffices, however, that the other transmission path can be used for transmitting additional-view video images.

(22) In the above-mentioned embodiment, description has been made on the assumption that the content described in the VCT for 2D is also described in the VCT for 3D. The content of the VCT for 2D, however, may not be described in the VCT for 3D. In this case, the video playback device 120 conforming to the extended ATSC standard is required to acquire the VCT for 3D to obtain a virtual channel entry relating to a 3D virtual channel, and to separately acquire the VCT for 2D to obtain a virtual channel entry relating to a 2D virtual channel.

In the above-mentioned embodiment, description has been made on the assumption that the content described in the MGT for 2D is also described in the MGT for 3D. The content of the MGT for 2D, however, may not be described in the MGT for 3D. In this case, the video playback device 120 conforming to the extended ATSC standard is required to acquire the MGT for 2D separately from the MGT for 3D.

(23) In the above-mentioned embodiment, the 3D_program_info_descriptor and the 3D_service_location_descriptor have been described in a virtual channel entry relating to a 3D virtual channel. The 3D_program_info_descriptor and the 3D_service_location_descriptor, however, may be described in a virtual channel entry relating to a 2D virtual channel.

In this case, the 3D_program_info_descriptor and the 3D_service_location_descriptor indicate a transmission path from which an additional-view video image is to be acquired when display of a 2D video image (e.g. a base-view video image) relating to a 2D virtual channel is switched to display of a 3D video image.

With this structure, the video playback device 120 can identify a transmission path from which the additional-view video image is to be acquired by referring to the virtual channel entry relating to the 2D virtual channel. That is to say, the video playback device 120 can acquire the additional-view video image based on the descriptions in the 3D_program_info_descriptor and the 3D_service_location_descriptor, generate a 3D video image from the base-view video image and the additional-view video image, and play back the generated 3D video image, without changing virtual channels.

(24) A control program including a program code in a machine language or a high-level language for causing processors of the video transmission device 110 and the video playback device 120, and various circuits connected to the processors to perform the video transmission processing, the EPG display processing, the 3D video playback processing, and the processing to switch between a 3D video image and a 2D video image described in the above embodiment may be recorded on a recording medium, or may be circulated or distributed via various communication paths. Examples of the recording medium are an IC card, a hard disk, an optical disc, a flexible disk, ROM, and flash memory. The control program thus circulated or distributed is provided for use by being stored in memory and the like readable to a processor. By the processor executing the control program, various functions described in the embodiment are achieved. In addition to directly executing the control program, the processor may execute the control program after compiling the control program, and may execute the control program by using an interpreter.

(25) Each of the functional components (e.g. the AV processing unit 1102, the transmission processing unit 1103, the transmission processing unit 1104, the transmission processing unit 1105, the control unit 1106, the writing unit 1107, the reception processing unit 1311, the reception processing unit 1312, the reception processing unit 1313, the AV decoding unit 1314, the display unit 1315, the input unit 1316, the control unit 1317, and the reading unit 1318) described in the above-mentioned embodiment may be implemented as a circuit for performing their functions, or may be implemented by one or more processors executing a program.

Each of the functional components described above is typically implemented as LSI, which is a kind of an integrated circuit. Each of the functional components may be configured as a single chip, or part or all thereof may be configured as a single chip. While referred to here as LSI, depending on the degree of integration, the terms IC, system LSI, super LSI, or ultra LSI are also used. A method of integration is not limited to LSI, and a dedicated circuit or a general-purpose processor may be used. A field programmable gate array (FPGA), which is LSI that can be programmed after manufacture, or a reconfigurable processor, which is LSI whose connections between internal circuit cells and settings for each circuit cell can be reconfigured, may be used. Additionally, if technology for integrated circuits that replaces LSI emerges, owing to advances in semiconductor technology or to another derivative technology, the integration of functional blocks may naturally be accomplished using such technology. The application of biotechnology or the like is possible.

(26) The above-mentioned embodiment and modifications may partially be combined with one another.

<5. Supplemental Note>

The following describes the structures, the modifications, and the effects of the video playback device and the video transmission device as one embodiment of the present invention.

(1) A video transmission device pertaining to one embodiment of the present invention is a video transmission device for transmitting a video image, comprising: a storage unit configured to store therein a plurality of video images transmitted through respective virtual channels, and virtual channel information pieces including definition information pieces defining the respective virtual channels; and a transmission unit configured to transmit the video images and the virtual channel information pieces through the respective virtual channels, wherein the video images stored in the storage unit include one of two viewpoint images constituting a 3D video image, and in one of the definition information pieces defining one of the virtual channels through which the one of the two viewpoint images is transmitted, transmission form information indicating a form of transmitting the other one of the two viewpoint images constituting the 3D video image is described.

With this structure, the video playback device for receiving the video image can identify, with reference to one of the definition information pieces when selecting a virtual channel through which the 3D video image is received, a transmission path for the one of the two viewpoint images and a transmission path for the other one of the two viewpoint images. Thus, even when the one of the two viewpoint images and the other one of the two viewpoint images are transmitted through different transmission paths, the video playback device can acquire both of the images and play back the 3D video image.

(2) The transmission form information may indicate a type of a transmission path for the other one of the two viewpoint images.

With this structure, the video playback device can recognize whether it is necessary to acquire the other one of the two viewpoint images from a transmission path different from a transmission path for the one of the two viewpoint images, and acquire the other one of the two viewpoint images from the different transmission path when it is necessary.

(3) The type of the transmission path may indicate any of broadcasting, a network, and a device in which the other one of the two viewpoint images is stored in advance.

With this structure, the video playback device can identify a transmission path through which the other one of the two viewpoint images is to be acquired, and acquire the other one of the two viewpoint images through the identified transmission path.

(4) When the transmission unit transmits the other one of the two viewpoint images, the transmission form information may indicate a transmission path that is the same as a transmission path for the one of the two viewpoint images.

With this structure, the video playback device can recognize that the other one of the two viewpoint images is to be received through a transmission path for the one of the two viewpoint images, and acquire the other one of the two viewpoint images through the transmission path.

(5) Each of the virtual channel information pieces may be a Virtual Channel Table (VCT) conforming to the Advanced Television System Committee (ATSC) Program and System Information Protocol (PSIP) standard.

With this configuration, the video playback device can identify, by receiving the VCT, a type of a transmission path for the other one of the two viewpoint images that can be transmitted through a transmission path which is the same as the transmission path for the one of the two viewpoint images and other various transmission paths, and receive the other one of the two viewpoint images from the identified transmission path.

(6) A video transmission method pertaining to another embodiment of the present invention is a video transmission method performed by a video transmission device for transmitting a video image, the video transmission method comprising: an acquisition step of acquiring a plurality of video images transmitted through respective virtual channels, and virtual channel information pieces including definition information pieces defining the respective virtual channels; and a transmission step of transmitting the video images and the virtual channel information pieces through the respective virtual channels, wherein the acquired video images include one of two viewpoint images constituting a 3D video image, and in one of the definition information pieces defining one of the virtual channels through which the one of the two viewpoint images is transmitted, transmission form information indicating a form of transmitting the other one of the two viewpoint images constituting the 3D video image is described.

With this structure, the video playback device for receiving the video image can identify, with reference to one of the definition information pieces when selecting a virtual channel through which the 3D video image is received, a transmission path for the one of the two viewpoint images and a transmission path for the other one of the two viewpoint images. Thus, even when the one of the two viewpoint images and the other one of the two viewpoint images are transmitted through different transmission paths, the video playback device can acquire both of the images and play back the 3D video image.

(7) A video playback device pertaining to yet another embodiment of the present invention is a video playback device for receiving and playing back a video image through a virtual channel, the video playback device comprising: a reception unit configured to receive virtual channel information pieces including definition information pieces defining respective virtual channels, and a video image; an acquisition unit configured to, when one of the definition information pieces defining one of the virtual channels relating to the received video image includes transmission form information indicating a form of transmitting one of two viewpoint images constituting a 3D video image, acquire the other one of the two viewpoint images in accordance with the transmission form information; and a playback unit configured to play back the 3D video image using the video image received by the reception unit and the other one of the two viewpoint images acquired by the acquisition unit.

With this configuration, the video playback device can receive the one of the two viewpoint images constituting the 3D video image, receive the other one of the two viewpoint images that can be transmitted through a transmission path which is the same as the transmission path for the one of the two viewpoint images and other various transmission paths, and play back the 3D video image by using the one of the two viewpoint images and the other one of the two viewpoint images.

(8) A video transmission device pertaining to yet another embodiment of the present invention is a video transmission device for transmitting a video image to a video playback device, the video transmission device comprising: a storage unit configured to store therein a 3D video image associated with a 2D video image; and a transmission unit configured to transmit the 3D video image, information defining a program relating to the 2D video image, and information defining a program relating to the 3D video image through a single virtual channel, wherein the information defining the program relating to the 3D video image includes linkage information for identifying the information defining the program relating to the 2D video image.

Each of the information defining the program relating to the 2D video image and the information defining the program relating to the 3D video image may be an Event Information Table (EIT) conforming to the Advanced Television System Committee (ATSC) Program and System Information Protocol (PSIP) standard, and the linkage information may include an event_id and a source_id, the source_id identifying a virtual channel for transmitting the program relating to the 2D video image.

With this structure, the video transmission device can link the program relating to the 3D video image to the program relating to the 2D video image, and generate and display an electronic program guide showing that the program relating to the 2D video image and the program relating to the 3D video image are linked to each other.

(9) The transmission unit may transmit identical status information by including the identical status information in the information defining the program relating to the 3D video image, the identical status information indicating whether at least one of two viewpoint images constituting the 3D video image is identical to the 2D video image or not, and the identical status information may be received by the video playback device.

With this structure, the video playback device can switch a video image being displayed from a 3D video image to a 2D video image by displaying one of the two viewpoint images constituting the 3D video image, without switching a processing from a processing to play back the 3D video image to a processing to play back the 2D video image.

(10) A video transmission method pertaining to yet another embodiment of the present invention is a video transmission method performed by a video transmission device for transmitting a video image to a video playback device, the video transmission method comprising: an acquisition step of acquiring a 3D video image associated with a 2D video image; and a transmission step of transmitting the 3D video image, information defining a program relating to the 2D video image, and information defining a program relating to the 3D video image through a single virtual channel, wherein the information defining the program relating to the 3D video image includes linkage information for identifying the information defining the program relating to the 2D video image.

With this structure, the video playback device for receiving the video image can link the program relating to the 3D video image to the program relating to the 2D video image, and generate and display a electronic program guide showing that the program relating to the 2D video image and the program relating to the 3D video image are linked to each other.

(11) A video playback device pertaining to yet another embodiment of the present invention is a video playback device for receiving and playing back a 3D video image, the video playback device comprising: a reception unit configured to receive a 3D video image associated with a 2D video image, information defining a program relating to the 2D video image, and information defining a program relating to the 3D video image through a single virtual channel; a determination unit configured to determine whether or not the information defining the program relating to the 3D video image includes linkage information for identifying the information defining the program relating to the 2D video image; and a display unit configured to, when a result of the determination by the determination unit is affirmative, generate and display an electronic program guide showing that the program relating to the 2D video image and the program relating to the 3D video image are associated with each other.

With this structure, the program relating to the 3D video image and the program relating to the 2D video image can be linked to each other, and an electronic program guide showing that the program relating to the 2D video image and the program relating to the 3D video image are linked to each other can be generated and displayed.

INDUSTRIAL APPLICABILITY

The video transmission device pertaining to one embodiment of the present invention transmits a video image so that the video playback device can identify a transmission path for one of two viewpoint images constituting a 3D video image, and is useful in the video transmission/reception system for transmitting and receiving a 2D video image and a 3D video image.

REFERENCE SIGNS LIST 100 video transmission/reception system
110 video transmission device
120 video playback device
121 USB memory
130 video playback device
501 virtual channel entry
710, 711, 720, 721 entry
1101 storage unit
1102 AV processing unit
1103-1105 transmission processing unit
1106 control unit
1107 writing unit
1111-1113 video encoding unit
1121-1123 multiplexing processing unit
1160 3D video image
1161 left-view video image
1162 right-view video image
1163 independent 3D video image (service compatible)
1164 3D video image (service incompatible)
1165 PSIP information
1311-1313 reception processing unit
1314 AV decoding unit
1315 display unit
1316 input unit
1317 control unit
1318 reading unit
1331 demultiplexing unit
1332 video decoding unit
1333 display control unit
1351 decoding processing unit (MPEG2)
1352 decoding processing unit (MPEG4 AVC)
1353 decoding processing unit (MPEG4 MVC)

The invention claimed is:

1. A video transmission device for transmitting video content to a video playback device, the video transmission device comprising:
a non-transitory memory configured to store therein 3D video content corresponding to 2D video content;
an encoder configured to encode images of one of two viewpoints constituting the 3D video content by using a first encoding scheme and generate a video stream of the 2D video content, and to encode images of both of the two viewpoints by using a second encoding scheme that is different from the first encoding scheme and generate a video stream of the 3D video content; and
a processor configured to transmit, via a communication circuit, the video stream of the 2D video content, the video stream of the 3D video content, information defining a program relating to the 2D video content, and information defining a program relating to the 3D video content, wherein
the information defining the program relating to the 3D video content includes linkage information for identifying the information defining the program relating to the 2D video content,
the processor transmits identical-status information by including the identical-status information in the information defining the program relating to the 3D video content, the identical-status information indicating that the images of the one of the two viewpoints correspond to the 2D video content, and
the identical-status information is to be received by the video playback device.

2. The video transmission device of claim 1, wherein each of the information defining the program relating to the 2D video image and the information defining the program relating to the 3D video image is an Event Information Table (EIT) conforming to the Advanced Television System Committee (ATSC) Program and System Information Protocol (PSIP) standard, and the linkage information includes an event_id and a source_id, the source_id identifying a virtual channel for transmitting the program relating to the 2D video image.

3. A video transmission method performed by a video transmission device for transmitting video content to a video playback device, the video transmission method comprising:
- an acquisition step of acquiring 3D video content corresponding to 2D video content;
- an encoding step of encoding images of one of two viewpoints constituting the 3D video content by using a first encoding scheme and generating a video stream of the 2D video content, and encoding images of both of the two viewpoints by using a second encoding scheme that is different from the first encoding scheme and generating a video stream of the 3D video content; and
- a transmission step of transmitting the video stream of the 2D video content, the video stream of the 3D video content, information defining a program relating to the 2D video content, and information defining a program relating to the 3D video content, wherein
- the information defining the program relating to the 3D video content includes linkage information for identifying the information defining the program relating to the 2D video content,
- the transmission step transmits identical-status information by including the identical-status information in the information defining the program relating to the 3D video content, the identical-status information indicating that the images of the one of the two viewpoints correspond to the 2D video content, and
- the identical-status information is to be received by the video playback device.

4. A video playback device for receiving and playing back 3D video content, the video playback device comprising:
- a communication circuit configured to receive a video stream of 2D video content and a video stream of 3D video content corresponding to the 2D video content, information defining a program relating to the 2D video content, and information defining a program relating to the 3D video content;
- a playback unit configured to decode the video stream of the 2D video content by using a first decoding scheme to play back the 2D video content, and to decode the video stream of the 3D video content by using a second decoding scheme that is different from the first decoding scheme to play back the 3D video image;
- a processor configured to determine whether or not the information defining the program relating to the 3D video content includes linkage information for identifying the information defining the program relating to the 2D video content; and
- a display device configured to, when a result of the determination by the processor is affirmative, generate and display an electronic program guide showing that the program relating to the 2D video content and the program relating to the 3D video content are associated with each other; wherein
- the communication circuit receives identical-status information included in the information defining the program relating to the 3D video content, the identical-status information indicating whether images of one of two viewpoints constituting the 3D video content correspond to the 2D video content, and
- when an instruction to switch from playback of the 3D video content to playback of the 2D video content is received during playback of the 3D video content and the identical-status information indicates that images of one of two viewpoints constituting the 3D video content correspond to the 2D video content, the playback unit plays back the 2D video content by reproducing the images of the one of the two viewpoints constituting the 3D video content without switching to decoding of the stream of the 2D video content.

\* \* \* \* \*